United States Patent
Yoshizawa

(10) Patent No.: US 11,303,815 B2
(45) Date of Patent: Apr. 12, 2022

(54) IMAGING APPARATUS AND IMAGING METHOD

(71) Applicant: SONY CORPORATION, Tokyo (JP)

(72) Inventor: Yasuo Yoshizawa, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/765,781

(22) PCT Filed: Oct. 18, 2018

(86) PCT No.: PCT/JP2018/038756
§ 371 (c)(1),
(2) Date: May 20, 2020

(87) PCT Pub. No.: WO2019/106995
PCT Pub. Date: Jun. 6, 2019

(65) Prior Publication Data
US 2020/0296292 A1    Sep. 17, 2020

(30) Foreign Application Priority Data

Nov. 29, 2017  (JP) .............................. JP2017-228830
Dec. 8, 2017  (JP) .............................. JP2017-235750

(51) Int. Cl.
*H04N 5/232*    (2006.01)

(52) U.S. Cl.
CPC .............................. *H04N 5/23296* (2013.01)

(58) Field of Classification Search
CPC ........... H04N 5/23296; H04N 5/23299; H04N 5/247; G03B 15/00; G03B 2206/00; H04B 5/0062
See application file for complete search history.

(56) References Cited

U.S. PATENT DOCUMENTS

| 9,503,628 | B1* | 11/2016 | Alsalamah | ........... | G03B 17/561 |
| 10,602,046 | B2* | 3/2020 | Pan | ..................... | G06K 9/00355 |
| 2005/0001024 | A1* | 1/2005 | Kusaka | .............. | H04N 1/00153 |
| | | | | | 235/375 |

(Continued)

FOREIGN PATENT DOCUMENTS

| JP | 08-182091 A | 7/1996 |
| JP | 2003-163822 A | 6/2003 |

(Continued)

OTHER PUBLICATIONS

International Search Report and Written Opinion of PCT Application No. PCT/JP2018/038756, dated Dec. 18, 2018, 12 pages of ISRWO.

*Primary Examiner* — Chiawei Chen
(74) *Attorney, Agent, or Firm* — Chip Law Group

(57) ABSTRACT

Provided is an imaging apparatus including an imaging unit that performs imaging, a communication unit having a communication range corresponding to an imaging range in which the imaging is performed, and performs communication with an external apparatus located within the communication range, and an imaging control unit that controls processing regarding the imaging on the basis of information regarding the external apparatus acquired through the communication and pre-setting associated with the information regarding the external apparatus.

22 Claims, 22 Drawing Sheets

(56) References Cited

U.S. PATENT DOCUMENTS

| | | | | |
|---|---|---|---|---|
| 2006/0078329 A1* | 4/2006 | Ohnishi | H04N 5/232933 | 396/429 |
| 2008/0112699 A1* | 5/2008 | Huseth | G01S 5/02 | 396/89 |
| 2011/0013032 A1* | 1/2011 | Hatanaka | H04N 5/23203 | 348/211.4 |
| 2011/0069179 A1* | 3/2011 | Bathiche | H04N 5/247 | 348/207.1 |
| 2011/0250839 A1* | 10/2011 | Lee | H04B 1/3816 | 455/41.1 |
| 2013/0286232 A1* | 10/2013 | Sheth | H04N 1/00973 | 348/207.11 |
| 2015/0062335 A1* | 3/2015 | Murakami | H04W 24/04 | 348/143 |
| 2015/0244985 A1* | 8/2015 | Igarashi | H04R 1/326 | 348/14.08 |
| 2016/0021230 A1* | 1/2016 | Watanabe | H04W 4/80 | 348/552 |
| 2016/0094790 A1* | 3/2016 | Yu | G06T 7/20 | 348/169 |
| 2019/0052798 A1* | 2/2019 | Yokokawa | H04N 5/232935 | |
| 2019/0313020 A1* | 10/2019 | Snyder | H04N 5/23219 | |
| 2020/0389061 A1* | 12/2020 | Lee | H04W 52/18 | |

FOREIGN PATENT DOCUMENTS

| | | |
|---|---|---|
| JP | 2005-123931 A | 5/2005 |
| JP | 2005-123932 A | 5/2005 |
| JP | 2006-025250 A | 1/2006 |
| JP | 2006-174010 A | 6/2006 |
| JP | 2009-105697 A | 5/2009 |
| JP | 2011-024015 A | 2/2011 |

* cited by examiner

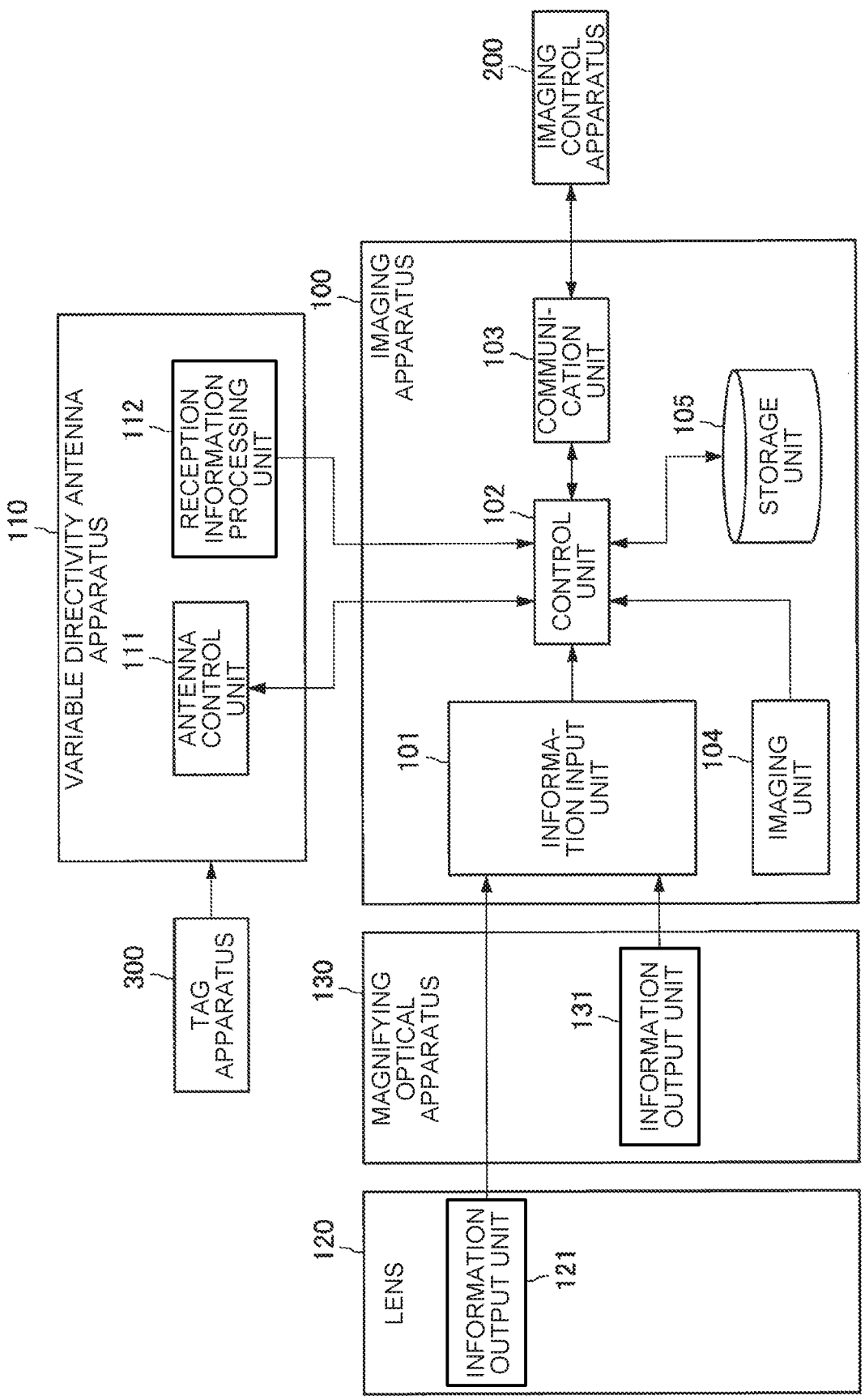

FIG.5

```
<?xml spversion="1.0" spencoding="UTF-8"?>
<PlanningMetadata
xmlns="http://..." spassignId="H00123" spcreationDate="2015-09-30T08:00:00Z" splastUpdate="2015-09-30T15:00:00Z" spversion="1.00">
<Propertiesspproperty Id="assignment" spclass="original" spupdate="2015-09-30T15:00:00Z" spmodifiedBy="Chris">
<Title spusAscii="..." spxml:lang="ja">...</Title>
<Metaspname="Tag1" spcontent="BOY"/>
<Metaspname="Tag2" spcontent="DOG"/>
<Metaspname="Tag3" spcontent="GIRL"/>
<Metaspname="Tag4" spcontent="CAT"/>
</Properties>
</PlanningMetadata>
```

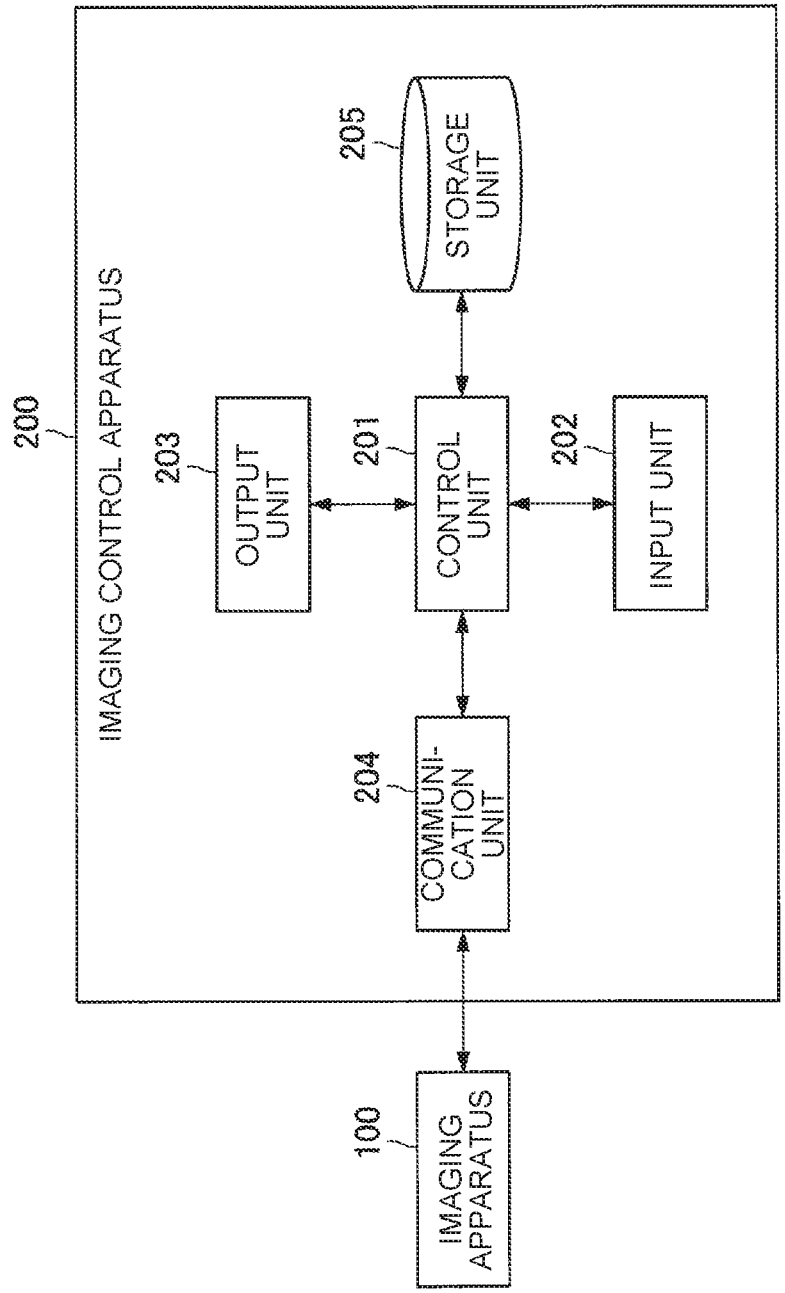

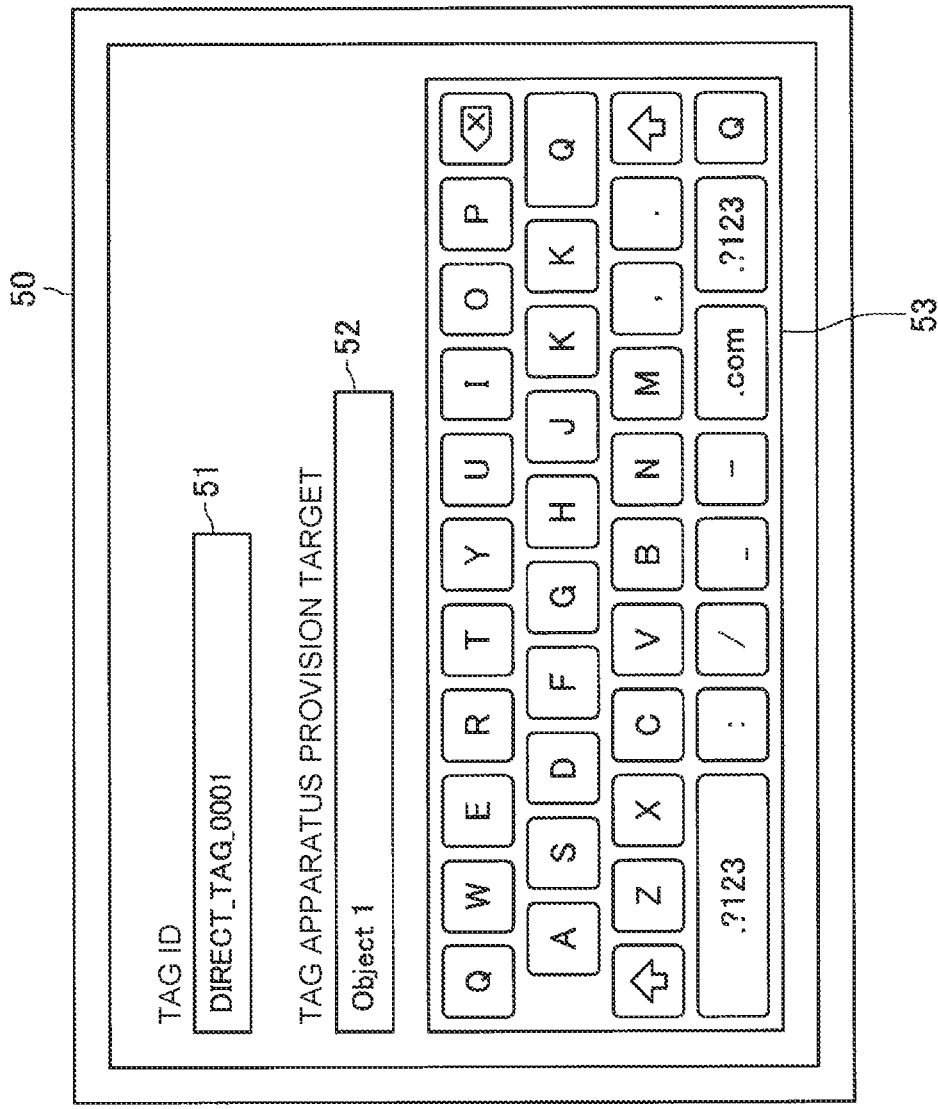

FIG.19

| TAG APPARATUS PROVISION TARGET / SCENE NAME | Object 1 | Object 2 | Object 3 | Object 4 | ... |
|---|---|---|---|---|---|
| SCENE 1 | ○ | — | ○ | — | ... |
| SCENE 2 | ○ | ○ | — | — | ... |
| SCENE 3 | ○ | — | ○ | ○ | ... |
| SCENE 4 | — | ○ | ○ | — | ... |
| ... | ... | ... | ... | ... | ... |

IMAGING APPARATUS AND IMAGING METHOD

CROSS REFERENCE TO RELATED APPLICATIONS

This application is a U.S. National Phase of International Patent Application No PCT/JP2018/038756 filed on Oct. 18, 2018, which claims priority benefit of Japanese Patent Application No. JP 2017-235750 filed in the Japan Patent Office on Dec. 8, 2017 and also claims priority benefit of Japanese Patent Application No. JP 2017-228830 filed in the Japan Patent Office on Nov. 29, 2017. Each of the above-referenced applications is hereby incorporated herein by reference in its entirety.

FIELD

The present disclosure relates to an imaging apparatus, an imaging method, and a program.

BACKGROUND

In recent years, with development of an information processing technology, or the like, various imaging technologies have been developed. For example, the following Patent Literature 1 discloses a technology of, in a system which captures an image of a subject such as a target (object), or the like, for which an image is to be captured, and to which a tag apparatus is provided, controlling processing regarding imaging on the basis a detected tag ID. More specifically, Patent Literature 1 discloses a technology of controlling processing of distribution, accumulation, or the like, of a captured video on the basis of the detected tag ID.

CITATION LIST

Patent Literature

Patent Literature 1: JP 2005-123932 A

SUMMARY

Technical Problem

However, with the technology, or the like, disclosed in Patent Literature 1, a user could not flexibly set content of imaging control based on the detected tag ID. More specifically, because the content of imaging control based on the tag ID is fixed, and the user cannot freely set or change the content of imaging control, it is difficult for the technology, or the like, disclosed in Patent Literature 1 to address a wide variety of user's needs regarding imaging.

Therefore, the present disclosure has been made in view of the above-described problem, and an object of the present disclosure is to provide a new and improved imaging apparatus, imaging method, and program which allows a user to flexibly set content of imaging control based on a detected tag ID.

Solution to Problem

According to the present disclosure, an imaging apparatus is provided that includes: an imaging unit that performs imaging; a communication unit that has a communication range corresponding to an imaging range in which the imaging is performed, and performs communication with an external apparatus located within the communication range; and an imaging control unit that controls processing regarding the imaging on a basis of information regarding the external apparatus acquired through the communication and pre-setting associated with the information regarding the external apparatus.

According to the present disclosure, an imaging method to be executed by a computer is provided that includes: performing imaging; performing communication with an external apparatus located within a communication range which is provided to correspond to an imaging range in which the imaging is performed; and controlling processing regarding the imaging on a basis of information regarding the external apparatus acquired through the communication and pre-setting associated with the information regarding the external apparatus.

According to the present disclosure, a program is provided that causes a computer to realize: performing imaging; performing communication with an external apparatus located within a communication range which is provided to correspond to an imaging range in which the imaging is performed; and controlling processing regarding the imaging on a basis of information regarding the external apparatus acquired through the communication and pre-setting associated with the information regarding the external apparatus.

According to the present disclosure, an imaging apparatus is provided that includes: an imaging unit that performs imaging; a communication unit that has a communication range corresponding to an imaging range in which the imaging is performed and performs communication with an external apparatus located within the communication range; and a control unit that controls the imaging range and the communication range in coordination with each other.

Advantageous Effects of Invention

According to the present disclosure as described above, it is possible to allow a user to flexibly set content of imaging control based on a detected tag ID.

Note that the effects described above are not necessarily limitative. With or in the place of the above effects, there may be achieved any one of the effects described in this specification or other effects that may be grasped from this specification.

BRIEF DESCRIPTION OF DRAWINGS

FIG. 4 is a block diagram illustrating a functional configuration example of an imaging apparatus 100 and a variable directivity antenna apparatus 110.

FIG. 5 is a view illustrating an example of file data to be associated with captured image data.

FIG. 6 is a block diagram illustrating a functional configuration example of an imaging control apparatus 200.

FIG. 7 is a view illustrating a display example of an output unit 203.

FIG. 19 is a view for explaining a scene estimation function to be realized by a plurality of tag apparatuses 300 being used.

DESCRIPTION OF EMBODIMENTS

Figure 1:
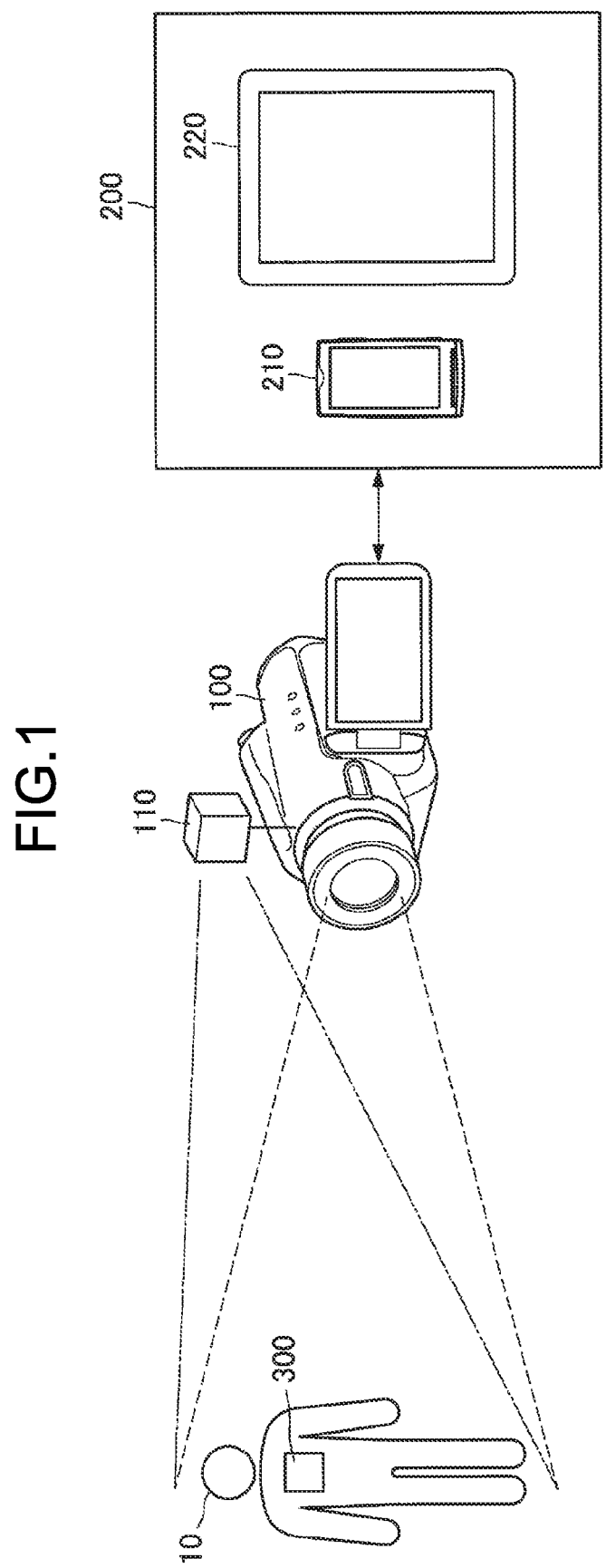
FIG. 1 is a view illustrating a configuration example of an imaging system according to a first embodiment.

Hereinafter, a preferred embodiment of the present disclosure will be described in detail with reference to the appended drawings. Note that, in this specification and the appended drawings, components that have substantially the same function and configuration are denoted with the same reference numerals, and repeated explanation of these structural elements is omitted.

Note that description will be provided in the following order.

1. First embodiment
1.1. Outline
1.2. System configuration example
1.3. Functional configuration example of imaging apparatus 100 and peripheral equipment
1.4. Functional configuration example of imaging control apparatus 200
1.5. Functional configuration example of tag apparatus 300
1.6. Example of processing flow
2. Second embodiment
3. Third embodiment
4. Fourth embodiment
5. Modified examples
5.1. Use of a plurality of tag apparatuses 300
5.2. Prevention of malfunction due to change of communication range
6. Application examples
7. Conclusion 1. First Embodiment (1.1. Outline)

First, outline of a first embodiment according to the present disclosure will be described.

For example, work to be performed in association with capturing of video content, a video, or the like, for TV broadcasting (or for distribution on the Internet) covers a wide range, and creators bear a great burden. More specifically, the creators are required to judge a timing for start or end of imaging, framing (work for determining a position and a size in a camera frame of a subject for whom an image is captured), switching of cameras, video correction processing and the like such as white balance processing, luminance processing or blur correction processing and the like, and the creators consume enormous resources to perform these kinds of work.

Further, there is a great need for metadata (for example, data indicating a subject, a scene, an imaging environment, or the like) regarding video content. For example, in a case where desired video content is searched for from enormous pieces of video content, or in a case where a desired scene is searched for among video content, a user can efficiently perform search using metadata regarding the video content. However, in a current situation, to generate metadata regarding video content, it is often the case that the user is required to manually perform input work upon imaging, and, if the user forgets this work, the user cannot obtain the metadata regarding video content.

Further, in recent years, service which allows video content to be distributed using a simple method actively appears. For example, a user can easily distribute video content by uploading video content which is personally captured to a predetermined web site. However, in a case where the user personally creates video content for these kinds of service, it is not easy to perform various kinds of work as described above alone or with a few people. In view of these backgrounds, a technology of enabling work in association with creation of video content to be easily and more efficiently realized is desired.

The above-described Patent Literature 1 discloses a technology of enabling control of processing of distribution, accumulation, or the like, of a video on the basis of a tag ID by detecting the tag ID of a tag apparatus provided to a subject. However, as described above, because the content of imaging control based on the tag ID is fixed, and the user cannot freely set or change the content of imaging control, it is difficult for the technology, or the like, disclosed in Patent Literature 1 to address a wide variety of user's needs regarding imaging.

In view of the circumstances described above, a discloser of the present case has created a technology according to the present disclosure. An imaging apparatus according to the present disclosure includes an imaging unit configured to perform imaging, a communication unit configured to perform communication with a tag apparatus located within a communication range corresponding to an imaging range, and an imaging control unit configured to control processing regarding imaging on the basis of information regarding the tag apparatus (such as, for example, a tag ID and scene information) and pre-setting by a user. By this means, the user can set in advance content of imaging control based on the tag ID detected through communication with the tag apparatus, and the imaging apparatus can appropriately perform imaging control on the basis of the setting. Embodiments of the present disclosure will be described in detail below.

(1.2. System Configuration Example)

The outline of the first embodiment according to the present disclosure has been described above. Subsequently, a configuration example of an imaging system according to the present embodiment will be described with reference to FIG. 1.

As illustrated in FIG. 1, the imaging system according to the present embodiment includes an imaging apparatus 100, a variable directivity antenna apparatus 110, an imaging control apparatus 200, and a tag apparatus 300.

(Imaging Apparatus 100)

The imaging apparatus 100 is an imaging apparatus which captures an image of a subject 10 who wears (or carries) the tag apparatus 300, and can control processing regarding imaging on the basis of the detected tag ID of the tag apparatus 300 and the pre-setting by the user.

More specifically, first, the user sets in advance content of imaging control to be executed in a case where a tag ID using the imaging control apparatus 200, and the imaging control apparatus 200 provides setting information to the imaging apparatus 100. By this means, the imaging apparatus 100 can appropriately execute processing on the basis of the pre-setting in a case where a tag ID is detected. While the content of imaging control to be executed by the pre-setting includes, for example, start or end of imaging, video correction processing and the like such as white balance processing, luminance processing or blur correction processing and the like, the content is not limited to these. By this means, the user can cause the imaging apparatus 100 to perform desired imaging control.

If detection of a tag ID by the imaging apparatus 100 is more specifically described, the imaging apparatus 100 has a communication range corresponding to an imaging range of the own apparatus, and includes the variable directivity antenna apparatus 110 which performs communication with the tag apparatus 300 located within this communication range. For example, the imaging range refers to an angle of view of the imaging apparatus 100, the communication range refers to an angle at which communication is possible when the variable directivity antenna apparatus 110 is set as a reference, and it is assumed that the angle of view is smaller than the angle at which communication is possible.

Figure 2:
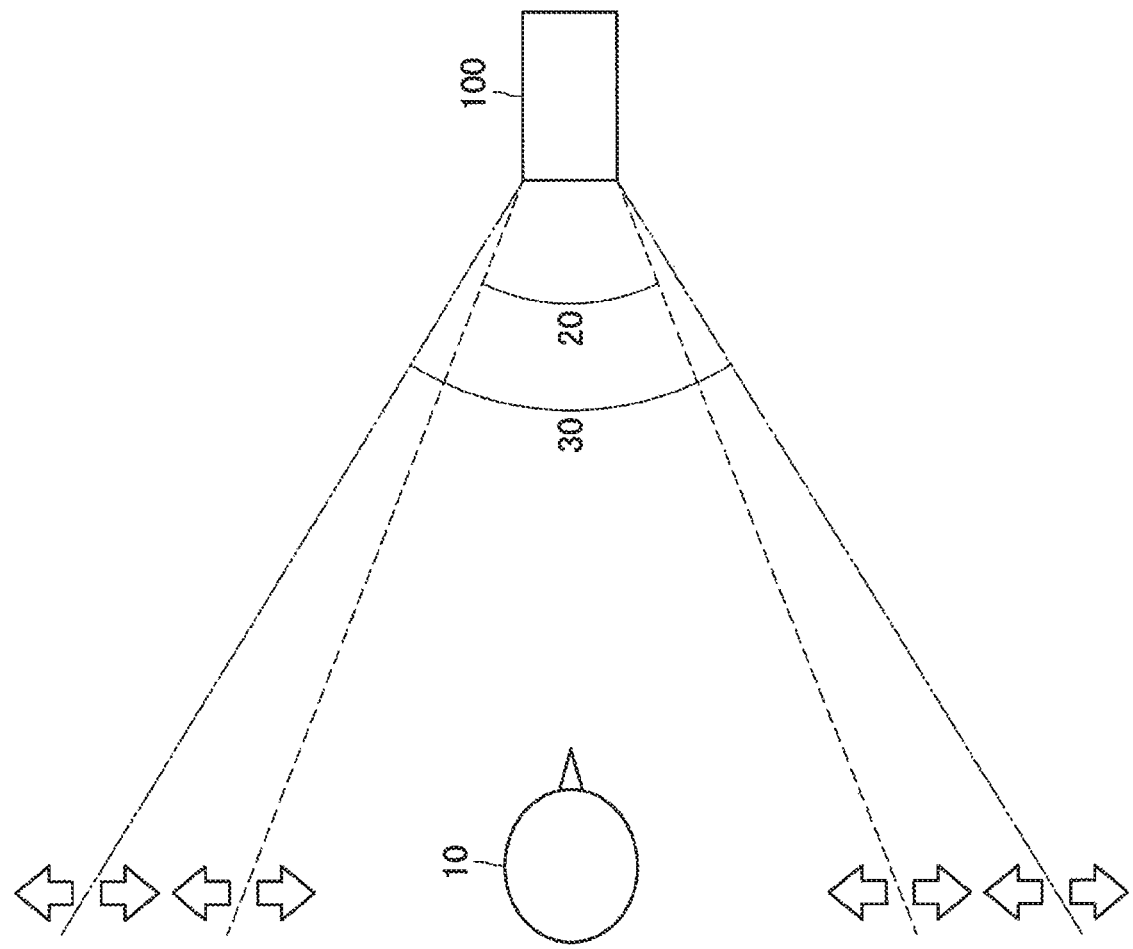
FIG. 2 is a view illustrating relationship between an imaging range and a communication range.

Here, relationship between the imaging range and the communication range will be described with reference to FIG. 2 and FIG. 3. FIG. 2 is a plan view (overhead view) illustrating aspect where the imaging apparatus 100 captures an image of the subject 10. The imaging range of the imaging apparatus 100 is a range within the angle of view 20, and the communication range is a range within the angle at which communication is possible (note that, in FIG. 2, the variable directivity antenna apparatus 110 is omitted). Further, as illustrated in FIG. 2, it is assumed that the angle of view 20 is smaller than the angle at which communication is possible 30.

Figure 3:
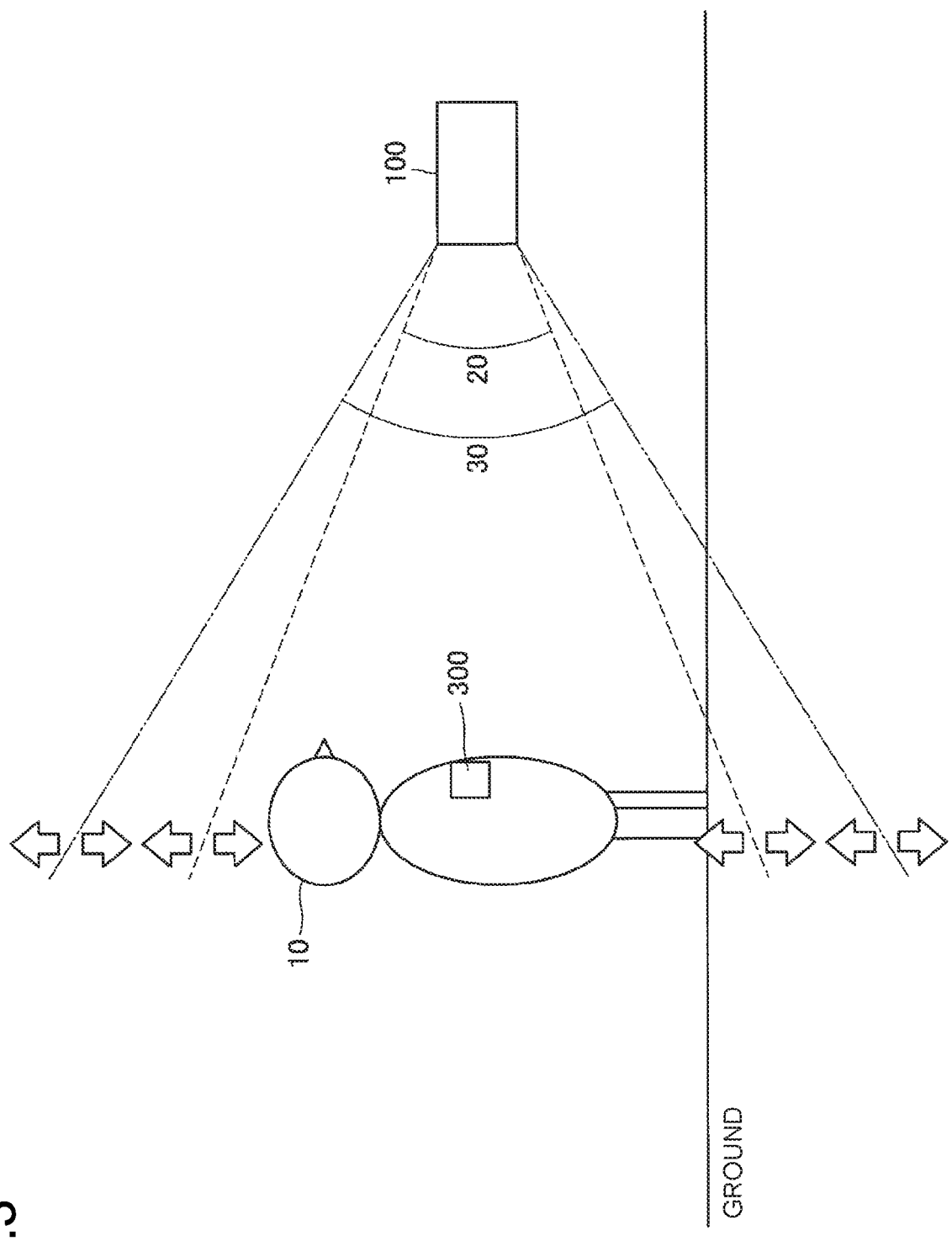
FIG. 3 is a view illustrating relationship between an imaging range and a communication range.

Further, FIG. 3 is a side view (view viewed from edge-on) illustrating aspect where the imaging apparatus 100 captures an image of the subject 10 (note that, also in FIG. 3, the variable directivity antenna apparatus 110 is omitted). Also in the side view, it is assumed that the angle of view 20 is smaller than the angle at which communication is possible 30. By this means, the variable directivity antenna apparatus 110 can not only acquire a tag ID by performing communication with the tag apparatus 300 in a case where the subject 10 is located within the imaging range, but also can acquire a tag ID in a similar manner if the subject 10 is located within the communication range although the subject 10 is located outside the imaging range. Therefore, the imaging apparatus 100 can grasp the subject 10 located outside the imaging range and within the communication range as well as the subject 10 located within the imaging range by the tag ID being provided from the variable directivity antenna apparatus 110.

Then, the imaging apparatus 100 causes the imaging range to coordinate with the communication range. More specifically, the imaging apparatus 100 expands the communication range by controlling the variable directivity antenna apparatus 110 in a case where the imaging range expands, and, inversely, narrows the communication range in a case where the imaging range narrows. By this means, the imaging apparatus 100 can appropriately maintain relationship between the imaging range and the communication range even in a case where the angle of view 20 is changed as in a case of zooming-up, or the like, in response to user operation.

Note that the relationship between the imaging range and the communication range is not limited to the relationship illustrated in FIG. 2 and FIG. 3. For example, the imaging range may be substantially the same as the communication range (in other words, the angle of view 20 may be substantially the same as the angle at which communication is possible 30), or the imaging range may be smaller than the communication range (in other words, the angle of view 20 may be smaller than the angle at which communication is possible 30). Further, the imaging range and the communication range may be expressed with values other than the angle of view 20 and the angle at which communication is possible 30.

Further, the imaging apparatus 100 can appropriately acquire metadata regarding video content by recording information regarding the detected tag ID in association with the captured image data. While, currently, there are technologies of automatically generating metadata by analyzing captured image data, in the technologies, not only processing load is high, but also there is a case where metadata is not appropriately generated in a case where an image of a subject which is behind an obstacle is captured. Meanwhile, in the present embodiment, because metadata is generated on the basis of a wireless signal from the tag apparatus 300, it is possible to suppress processing load to be lower than that in a case where captured image data is analyzed, and it is possible to appropriately generate metadata even if an image of the subject 10 which is behind an obstacle is captured, if the wireless signal from the tag apparatus 300 is received at the variable directivity antenna apparatus 110.

Note that a type of the imaging apparatus 100 is not particularly limited. For example, the imaging apparatus 100 may be any apparatus if the apparatus can capture a video, such as a portable video camera (including, for example, a video camera for business use or a video camera for home use), a stationary video camera (including, for example, a security camera), and an in-vehicle video camera (including, for example, a dashboard camera).

(Variable Directivity Antenna Apparatus 110)

As described above, the variable directivity antenna apparatus 110 is a communication apparatus connected to the imaging apparatus 100. Further, the variable directivity antenna apparatus 110 has directivity as a result of receiving sensitivity of a wireless signal from a set direction being higher than receiving sensitivity of wireless signals from other directions, and, as described above, has the communication range corresponding to the imaging range of the imaging apparatus 100. Further, because the variable directivity antenna apparatus 110 can change an orientation direction to an arbitrary direction by control by the imaging apparatus 100, as described above, it is possible to cause the communication range to coordinate with the imaging range.

Further, the variable directivity antenna apparatus 110 also function as a communication unit which performs wireless communication with the tag apparatus 300, and acquires a tag ID, or the like, through the wireless communication. More specifically, the variable directivity antenna apparatus 110 acquires a tag ID by receiving a wireless signal transmitted from the tag apparatus 300. Note that information which is communicated by the variable directivity antenna apparatus 110 and the tag apparatus 300 in a wireless manner is not limited to the tag ID. For example, by the tag apparatus 300 including information, or the like, regarding a state of the own apparatus (such as, for example, battery information and information regarding an environment where the own apparatus is placed) in a wireless signal, the variable directivity antenna apparatus 110 may acquire these kinds of information and use these kinds of information for arbitrary processing. Further, inversely, the variable directivity antenna apparatus 110 may include information regarding a state of the own apparatus or the imaging apparatus 100 (such as, for example, information of a communication scheme which can be supported by the own apparatus and information regarding an environment where the imaging apparatus 100 is placed), information regarding a state of the tag apparatus 300 (such as, for example, information indicating that the tag apparatus 300 is located within the angle of view and information indicating that the tag apparatus 300 is not located within the angle of view), or the like, in a wireless signal and may transmit the wireless signal to the tag apparatus 300. By this means, for example, the tag apparatus 300 can notify the subject 10 of these kinds of information through vibration, a video, sound, or the like, on the basis of the received wireless signal.

Further, a wireless communication scheme between the variable directivity antenna apparatus 110 and the tag apparatus 300 is not particularly limited. For example, wireless communication between the variable directivity antenna apparatus 110 and the tag apparatus 300 may be realized through Wi-Fi (registered trademark), Bluetooth (registered trademark), or the like.

Further, a type of the variable directivity antenna apparatus 110 and a method for changing an orientation direction are not particularly limited. Further, the number of the variable directivity antenna apparatuses 110 or aspect where the variable directivity antenna apparatus 110 is provided at the imaging apparatus 100 is not particularly limited.

(Imaging Control Apparatus 200)

The imaging control apparatus 200 is an information processing apparatus to be used for controlling the imaging apparatus 100. More specifically, the imaging control apparatus 200 generates control information on the basis of user operation, and controls the imaging apparatus 100 by transmitting the information to the imaging apparatus 100.

Further, the user can set content of imaging control to be executed in a case where a tag ID is detected using the imaging control apparatus 200. An example of the content of imaging control is as described above. Further, the imaging control apparatus 200 is an apparatus which can reproduce or edit video content captured by the imaging apparatus 100.

Note that, while it is assumed that the imaging control apparatus 200 is, for example, a smartphone 210 or a tablet personal computer (PC) 220 as illustrated in FIG. 1, the imaging control apparatus 200 is not limited to these. More specifically, the imaging control apparatus 200 may be an arbitrary information processing apparatus including a notebook PC, a desktop PC, an agent apparatus, a wearable apparatus, or the like.

(Tag Apparatus 300)

The tag apparatus 300 is an information processing apparatus which is worn (or carried) by the subject 10 and performs wireless communication with the variable directivity antenna apparatus 110. More specifically, when the tag apparatus 300 is activated, by the tag apparatus 300 transmitting wireless signals including information of the tag ID, or the like, at predetermined time intervals, the variable directivity antenna apparatus 110 can receive the wireless signals in a case where the tag apparatus 300 is located in the communication range of the variable directivity antenna apparatus 110.

As described above, information to be communicated by the tag apparatus 300 and the variable directivity antenna apparatus 110 in a wireless manner is not limited to the tag ID. Further, transmission intervals of the wireless signals by the tag apparatus 300 are not particularly limited. Further, the tag apparatus 300 may receive a wireless signal transmitted from the variable directivity antenna apparatus 110 as well as transmit a wireless signal.

Further, a type of the tag apparatus 300 is not particularly limited. For example, the tag apparatus 300 may be any apparatus if the apparatus can be worn or carried by a user, such as a smartphone, an arbitrary wearable apparatus (for example, a wristwatch type, spectacle type, accessory type, cloth type wearable apparatus, or the like) and a pin microphone.

The configuration example of the imaging system according to the present embodiment has been described above. Note that the above-described configuration described with reference to FIG. 1 is merely an example, and the configuration of the imaging system according to the present embodiment is not limited to the example. For example, part of functions of the imaging apparatus 100 may be provided at the variable directivity antenna apparatus 110 or the imaging control apparatus 200. For example, software which provides part of the functions of the imaging apparatus 100 (for example, application, or the like, in which a predetermined application programming interface (API) is used) may be executed on the variable directivity antenna apparatus 110 or the imaging control apparatus 200. Further, the number of respective apparatuses which constitute the imaging system may be changed as appropriate. The configuration of the imaging system according to the present embodiment can be flexibly transformed in accordance with specifications and operation.

(1.3. Functional Configuration Example of Imaging Apparatus 100 and Peripheral Equipment)

Subsequently, a functional configuration example of the imaging apparatus 100 according to the present embodiment and peripheral equipment of the imaging apparatus 100 will be described with reference to FIG. 4.

As illustrated in FIG. 4, the imaging apparatus 100 is connected to the variable directivity antenna apparatus 110, a lens 120 and a magnifying optical apparatus 130. Further, the variable directivity antenna apparatus 110 includes an antenna control unit 111 and a reception information processing unit 112. Further, the lens 120 includes an information output unit 121. Further, the magnifying optical apparatus 130 includes an information output unit 131. Further, the imaging apparatus 100 itself includes an information input unit 101, a control unit 102, a communication unit 103, an imaging unit 104 and a storage unit 105.

(Variable Directivity Antenna Apparatus 110)

The variable directivity antenna apparatus 110 is a communication apparatus which is connected to the imaging apparatus 100 and performs wireless communication with the tag apparatus 300. Because outline of the variable directivity antenna apparatus 110 has been described above, description will be omitted.

(Antenna Control Unit 111)

The antenna control unit 111 is a functional component which controls the communication range of the variable directivity antenna apparatus 110. More specifically, the control unit 102 of the imaging apparatus 100 determines the communication range of the variable directivity antenna apparatus 110 on the basis of the angle of view of the imaging apparatus 100, and provides control information for making a notification of the determined content to the antenna control unit 111. Then, the antenna control unit 111 controls the communication range of the variable directivity antenna apparatus 110 on the basis of the control information. Note that a control method of the communication range is not particularly limited, and an arbitrary publicly known technology can be used. For example, the variable directivity antenna apparatus 110 includes a plurality of antenna elements (array elements) arranged in a linear shape, a planar shape, a curved shape, or the like, and the antenna control unit 111 may realize control of the communication range by controlling power feeding, or the like, to the respective antenna elements. Further, the variable directivity antenna apparatus 110 may realize control of the communication range by a movable parabola antenna of which direction can be changed being provided.

(Reception Information Processing Unit 112)

The reception information processing unit 112 is a functional component which performs processing regarding a wireless signal received from the tag apparatus 300. For example, the reception information processing unit 112 estimates an arrival direction of the wireless signal and an isolation distance from a transmission source on the basis of a difference in received strength, phases, or the like, when a plurality of antenna elements receives the wireless signal. By this means, the reception information processing unit 112 can function as a position estimating unit which estimates a position of the tag apparatus 300 which has transmitted the wireless signal. The reception information processing unit 112 provides information regarding an estimation result of the position of the tag apparatus 300 to the control unit 102 of the imaging apparatus 100. While the information regarding the estimation result of the position of the tag apparatus 300 can be, for example, information indicating relative positional relationship between the variable directivity antenna apparatus 110 and the tag apparatus 300, the information is not limited to this.

Further, the reception information processing unit 112 extracts a tag ID, or the like, included in the wireless signal received from the tag apparatus 300 and provides the tag ID, or the like, to the control unit 102 of the imaging apparatus 100. Note that the information to be provided from the reception information processing unit 112 is not limited to these. For example, the reception information processing unit 112 may provide received strength information of the wireless signal to the control unit 102.

(Lens 120, Information Output Unit 121)

The lens 120 is a detachable interchangeable lens which is used at the imaging apparatus 100 with interchangeable lenses. A type of the lens 120 is not particularly limited if the lens has a communication function for performing communication with the imaging apparatus 100. The information output unit 121 of the lens 120 is a functional component which transmits information regarding the lens 120 (hereinafter, referred to as "lens information") to the imaging apparatus 100. For example, the information output unit 121 transmits position information, or the like, of a lens unit provided at the lens 120 to the imaging apparatus 100 as the lens information. Note that information to be transmitted from the information output unit 121 to the imaging apparatus 100 is not limited to this.

(Magnifying Optical Apparatus 130, Information Output Unit 131)

The magnifying optical apparatus 130 is a functional component which is attached on the imaging apparatus 100 side of the lens 120, and can expand the angle of view. While the magnifying optical apparatus 130 can be, for example, a wide converter lens, or the like, the magnifying optical apparatus 130 is not limited to this. The information output unit 131 of the magnifying optical apparatus 130 is a functional component which transmits information regarding the magnifying optical apparatus 130 (hereinafter, referred to as "magnifying apparatus information") to the imaging apparatus 100. For example, the information output unit 131 transmits information regarding the angle of view (or a focal length), or the like, to the imaging apparatus 100 as the magnifying apparatus information. Note that information to be transmitted from the information output unit 131 to the imaging apparatus 100 is not limited to this.

(Imaging Apparatus 100)

The imaging apparatus 100 is an apparatus which captures an image of the subject 10 who wears (or carries) the tag apparatus 300. Because the outline of the imaging apparatus 100 has been described above, description will be omitted.

(Information Input Unit 101)

The information input unit 101 is a functional component to which the lens information and the magnifying apparatus information are input through predetermined communication with the information output unit 121 of the lens 120 and the information output unit 131 of the magnifying optical apparatus 130. The information input unit 101 provides the input these kinds of information to the control unit 102.

(Control Unit 102)

The control unit 102 is a functional component which generally controls the overall processing to be performed by the imaging apparatus 100. For example, the control unit 102 can calculate the angle of view on the basis of the lens information and the magnifying apparatus information provided from the information input unit 101. Note that a calculation method of the angle of view is not particularly limited. Further, the control unit 102 may calculate the angle of view through analysis of the captured image data, or the like, instead of using these kinds of information. Further, the control unit 102 can also adjust the angle of view on the basis of user operation, or the like. In this case, the control unit 102 generates control information for realizing a desired angle of view and transmits the control information to the lens 120 or the magnifying optical apparatus 130 (a functional component which transmits the control information is not illustrated), to thereby control lens positions, or the like, of these functional components.

Then, the control unit 102 determines the communication range (such as an angle at which communication is possible) of the variable directivity antenna apparatus 110 on the basis of the angle of view, generates control information for making a notification of the determined content, and provides the control information to the variable directivity antenna apparatus 110, to thereby control the communication range of the variable directivity antenna apparatus 110.

Further, the control unit 102 determines whether or not the tag apparatus 300 is located within the angle of view on the basis of the information regarding the estimation result of the position of the tag apparatus 300 provided from the reception information processing unit 112 of the variable directivity antenna apparatus 110. As described above, the information regarding the estimation result of the position of the tag apparatus 300 is, for example, information indicating relative positional relationship between the variable directivity antenna apparatus 110 and the tag apparatus 300, or the like. Here, because the relative positional relationship between the variable directivity antenna apparatus 110 and the imaging apparatus 100 is known, the control unit 102 can determine whether or not the tag apparatus 300 is located within the angle of view on the basis of the information regarding the estimation result of the position of the tag apparatus 300.

The control unit 102 also functions as an imaging control unit which controls processing regarding imaging on the basis of the tag ID provided from the reception information processing unit 112 in a case where it is determined that the tag apparatus 300 is located within the angle of view. More specifically, because the control unit 102 grasps content of imaging control based on the tag ID on the basis of the setting information provided in advance from the imaging control apparatus 200, the control unit 102 can control processing regarding imaging on the basis of the tag ID provided from the reception information processing unit 112. For example, the control unit 102 can control start, end, or the like, of imaging processing on the basis of the provided tag ID. Further, in a case where the imaging unit 104 generates captured image data, the control unit 102 can perform video correction processing, or the like, on the captured image data on the basis of the provided tag ID. Note that the content of imaging control based on the tag ID is not limited to these. Further, respective types of imaging control may be performed at any timing before imaging, during imaging or after imaging. Further, if the tag apparatus 300 can recognize an imaging scene using any method including sensing, or the like, the control unit 102 may acquire information regarding the scene (scene information) from the tag apparatus 300 and may perform control similar to imaging control based on the tag ID on the basis of the scene information.

Further, the control unit 102 also functions as a recording unit which records the provided tag ID in predetermined file data (for example, extensible markup language (XML) file data) and records the file data and the captured image data in association with each other.

Here, an example of the file data generated by the control unit 102 will be described with reference to FIG. 5. FIG. 5 illustrates XML file data 40 as an example of the file data, and information regarding the tag ID is recorded in data 41 in the XML file data 40. For example, by "Metaspname="Tag1" spcontent="BOY"/", information indicating that the tag apparatus 300 having a tag ID of "Tag1" is included in the captured image data, and the tag ID indicates "BOY", is recorded (in other words, information indicating that the subject 10 in the character of a boy who wears the tag apparatus 300 having a tag ID of "Tag1" is included in the captured image data is recorded). Note that content of the file data is not limited to that illustrated in FIG. 5. Further, a method for associating the file data with the captured image data is not particularly limited. For example, the control unit 102 may associate the file data with the captured image data by recording identification information of the captured image data in the file data, recording identification information of the file data in the captured image data, or the like. The control unit 102 causes the file data and the captured image data to be stored by providing these kinds of data to the storage unit 105.

Note that processing by the control unit 102 is not limited to the above-described processing. For example, the control unit 102 may acquire the file data and the captured image data stored in the storage unit 105 on the basis of a request from the imaging control apparatus 200 and may provide the file data and the captured image data to the imaging control apparatus 200 via the communication unit 103. Further, the control unit 102 may control processing which is typically performed at a video camera, or the like.

(Communication Unit 103)

The communication unit 103 is a functional component which controls various kinds of communication with the imaging control apparatus 200. For example, in a case where the user sets in advance content of imaging control based on the tag ID using the imaging control apparatus 200, the communication unit 103 receives the setting information from the imaging control apparatus 200. Further, upon imaging, the communication unit 103 receives various kinds of control information to be used for imaging from the imaging control apparatus 200. Further, after imaging, when the user confirms the captured image data using the imaging control apparatus 200, the communication unit 103 transmits the captured image data and the file data associated with the captured image data to the imaging control apparatus 200. Note that information communicated by the communication unit 103 and a case where the communication unit 103 performs communication are not limited to these.

(Imaging Unit 104)

The imaging unit 104 is a functional component which executes imaging processing by being controlled by the control unit 102. For example, the imaging unit 104 includes a lens system including an imaging lens, a diaphragm, a zoom lens, a focusing lens, or the like, a drive system which causes the lens system to perform focusing operation and zooming operation, a solid-state imaging element array which performs photoelectric conversion on imaged light obtained at the lens system to generate captured image data, or the like. The solid-state imaging element array may be realized with, for example, a charge coupled device (CCD) sensor array, or a complementary metal oxide semiconductor (CMOS) sensor array.

The imaging unit 104 provides the captured image obtained by the solid-state imaging element array to the control unit 102.

(Storage Unit 105)

The storage unit 105 is a functional component which stores various kinds of information. For example, the storage unit 105 stores the above-described setting information, file data, captured image data, or the like, or stores a program, a parameter, or the like, to be used by respective functional components of the imaging apparatus 100. Note that the information stored in the storage unit 105 is not limited to these.

The functional configuration example of the imaging apparatus 100 and the peripheral equipment of the imaging apparatus 100 has been described above. Note that the functional components described above using FIG. 4 are merely an example, and the functional components of the imaging apparatus 100 and the peripheral equipment of the imaging apparatus 100 are not limited to the example. For example, the imaging apparatus 100 and the peripheral equipment of the imaging apparatus 100 do not necessarily have to include all the functional components illustrated in FIG. 4. Further, the functional components of the imaging apparatus 100 and the peripheral equipment of the imaging apparatus 100 can be flexibly transformed in accordance with specifications and operation.

(1.4. Functional Configuration Example of Imaging Control Apparatus 200)

The functional configuration example of the imaging apparatus 100 according to the present embodiment and the peripheral equipment of the imaging apparatus 100 has been described above. Subsequently, a functional configuration example of the imaging control apparatus 200 according to the present embodiment will be described with reference to FIG. 6.

As illustrated in FIG. 6, the imaging control apparatus 200 includes a control unit 201, an input unit 202, an output unit 203, a communication unit 204, and a storage unit 205.

(Control Unit 201)

The control unit 201 is a functional component which generally controls overall processing to be performed by the imaging control apparatus 200. For example, the control unit 201 can control activation and stop of respective components including the output unit 203 such as a display and a speaker on the basis of input, or the like, performed by the user using the input unit 202. Note that control content of the control unit 201 is not limited to these. For example, the control unit 201 may control processing which is typically performed at a smartphone 210, a tablet PC 220, a notebook PC, a desktop PC, an agent apparatus, a wearable apparatus, or the like.

(Input Unit 202)

The input unit 202 is a functional component which accepts input by the user. For example, the input unit 202 includes input means such as a mouse, a keyboard, a touch panel, a button, a switch and a microphone, and the user can perform control of the imaging apparatus 100, pre-setting, or the like, of content of imaging control to be executed in a case where a tag ID is detected, by using these kinds of input means. The input unit 202 provides the input content to the control unit 201. Note that the input means provided at the input unit 202 is not particularly limited.

(Output Unit 203)

The output unit 203 is a functional component which outputs various kinds of information. For example, the output unit 203 includes display means such as a display or sound output means such as a speaker, and displays a screen to be used for pre-setting of the imaging control content, the captured image data, or the like, at the display, or the like, or outputs sound using the speaker, or the like, on the basis of control by the control unit 201. Note that the output means provided at the output unit 203 is not particularly limited.

Here, an output example of the output unit 203 will be described with reference to FIG. 7 to FIG. 10. First, an example of a setting screen 50 for associating the tag ID of the tag apparatus 300 with a target to which the tag apparatus 300 is provided (such as, for example, a performer and a scene set) will be described with reference to FIG. 7. The user inputs the tag ID which is to be associated and a target to which the tag apparatus 300 is to be provided in a tag ID text box 51 and a tag apparatus provision target text box 52 on the setting screen 50. Note that, while an input method is not particularly limited, the user may perform input by tapping a software keyboard 53 displayed by the output unit 203.

Figure 8:
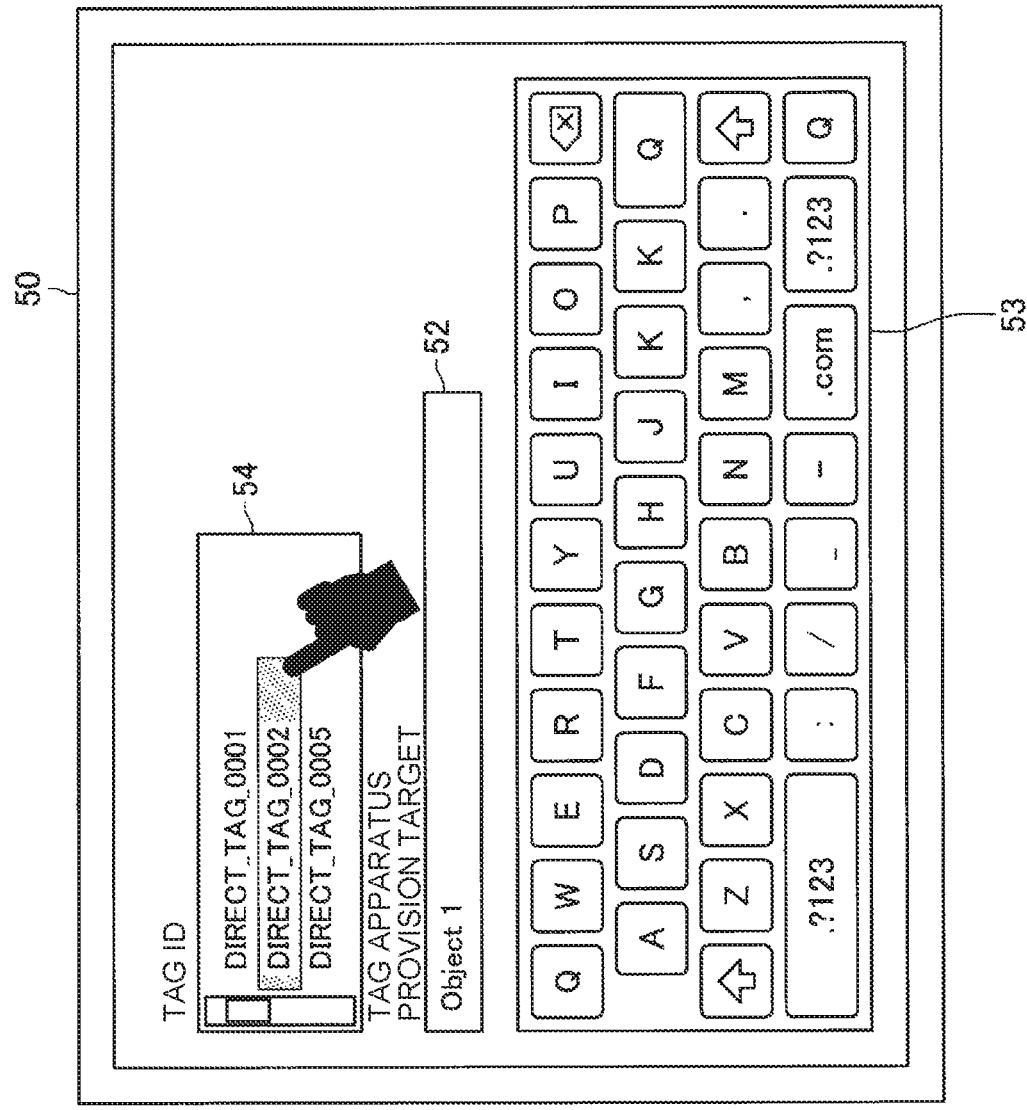
FIG. 8 is a view illustrating a display example of an output unit 203.

Note that the setting screen for association is not limited to this and can be changed as appropriate. For example, as illustrated in FIG. 8, the user may perform input using a tag ID pull-down 54 displayed by the output unit 203. More specifically, the tag ID of the tag apparatus 300 which is being detected by the variable directivity antenna apparatus 110 may be displayed at the tag ID pull-down 54 so as to be able to be selected. By this means, the user can perform input more easily. Note that, as well as the tag ID, a target to which the tag apparatus 300 is to be provided may be input through pull-down.

Figure 9:
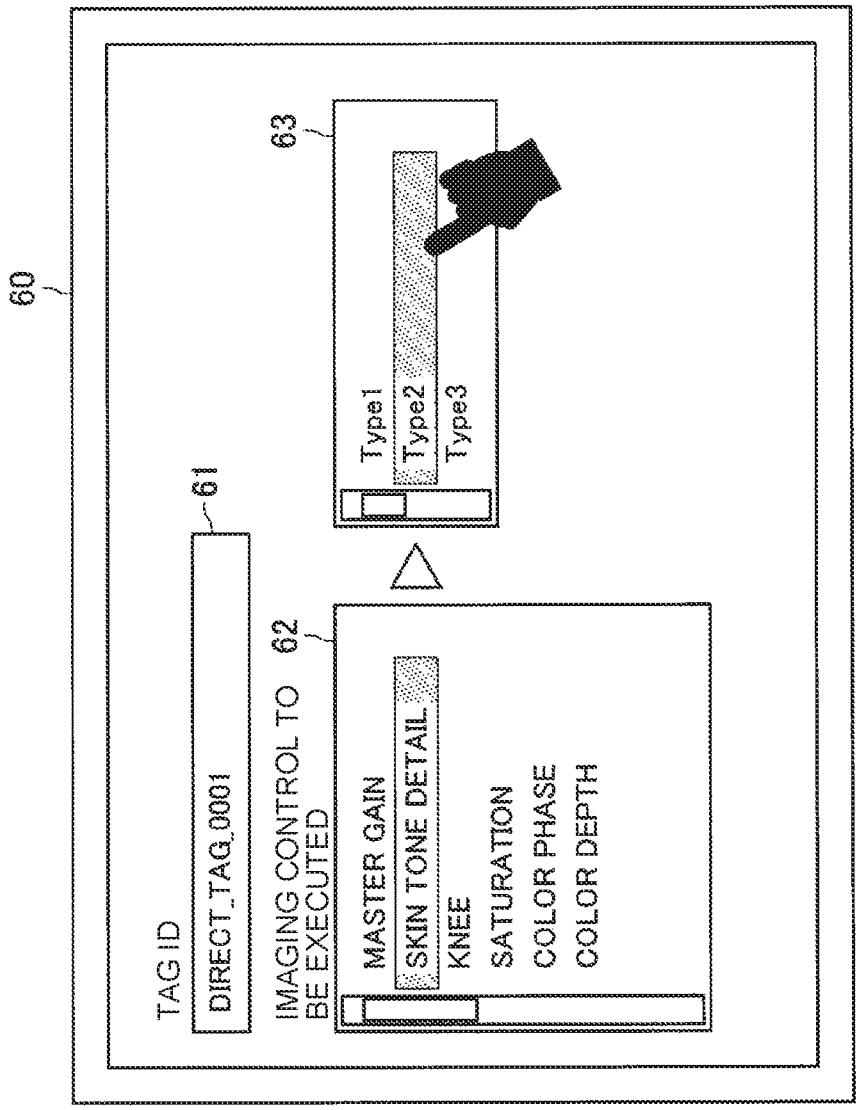
FIG. 9 is a view illustrating a display example of an output unit 203.

Subsequently, a setting screen 60 for imaging control to be executed on the basis of the tag ID will be described with reference to FIG. 9. The user inputs the tag ID to be set in a tag ID text box 61 of the setting screen 60 and makes setting using a setting pull-down 62 of imaging control to be executed. Note that, as illustrated in FIG. 9, a pull-down 63 for performing more detailed setting may be used. Note that various kinds of setting described with reference to FIG. 7 to FIG. 9 may be realized by capturing of a predetermined file (such as, for example, a comma separated values (CSV) file) instead of being input on a screen. By this means, even in a case where there are a number of pieces of setting content, the user can perform various kinds of setting more easily.

Figure 10:
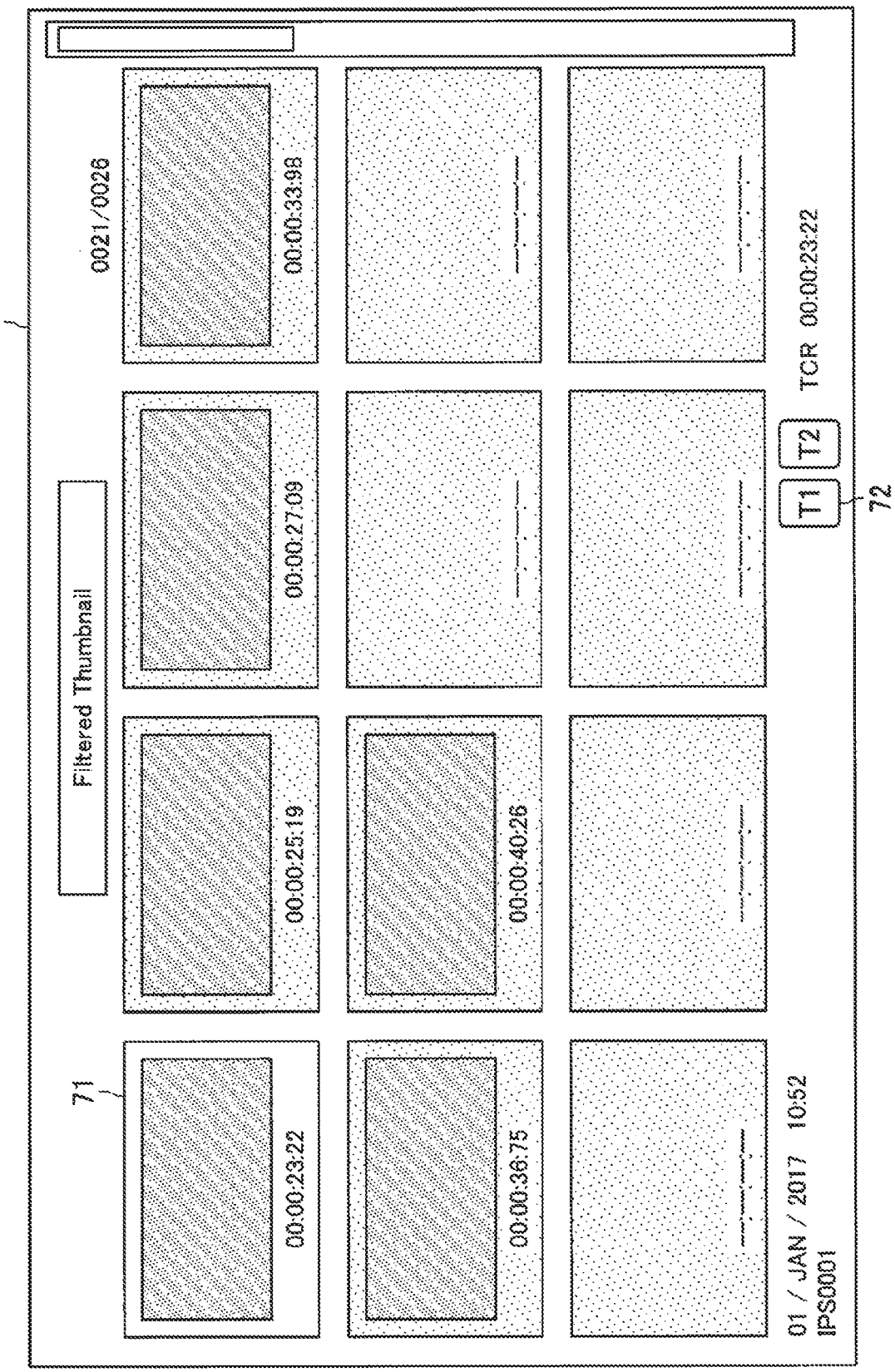
FIG. 10 is a view illustrating a display example of an output unit 203.

Subsequently, an example of a screen to be used upon browsing of the captured image data will be described with reference to FIG. 10. FIG. 10 illustrates an example of a screen 70 which displays a thumbnail of the captured image data on the basis of a detection status of the tag ID. As described above, predetermined file data is generated on the basis of the detection status of the tag ID, and the file data is associated with the captured image data. The output unit 203 of the imaging control apparatus 200 can create a thumbnail of the captured image data associated with each piece of file data and can display the thumbnail. As illustrated in FIG. 10, the output unit 203 displays a thumbnail 71 of the captured image data associated with each piece of file data and displays a tag ID 72 included in the captured image data (in the drawing, tag IDs of "T1" and "T2" are indicated) by analyzing the file data associated with the captured image data of the selected thumbnail 71. By this means, the user can easily recognize what is included in each piece of the captured image data.

Note that the respective screens in FIG. 7 to FIG. 10 may be displayed by an output unit of an apparatus other than the imaging control apparatus 200.

(Communication Unit 204)

The communication unit 204 is a functional component which controls various kinds of communication with the imaging apparatus 100. For example, in a case where the user sets in advance content of imaging control based on the tag ID, the communication unit 204 transmits the setting information to the imaging apparatus 100. Further, upon imaging, the communication unit 204 transmits various kinds of control information to be used for imaging to the imaging control apparatus 200. Further, after imaging, when the user confirms the captured image data using the imaging control apparatus 200, the communication unit 204 receives the captured image data and the file data associated with the captured image data from the imaging apparatus 100. Note that information communicated by the communication unit 204 and a case where the communication unit 204 performs communication are not limited to these.

(Storage Unit 205)

The storage unit 205 is a functional component which stores various kinds of information. For example, the storage unit 205 stores the above-described setting information, control information, captured image data, or file data associated with the captured image data, or the like, or stores a program, a parameter, or the like, to be used by respective functional components of the imaging control apparatus 200. Note that the information stored in the storage unit 205 is not limited to these.

The functional configuration example of the imaging control apparatus 200 has been described above. Note that the functional components described above using FIG. 6 are merely an example, and the functional components of the imaging control apparatus 200 are not limited to the example. For example, the imaging control apparatus 200 does not necessarily have to include all the functional components illustrated in FIG. 6. Further, the functional components of the imaging control apparatus 200 can be flexibly transformed in accordance with specifications and operation.

(1.5. Functional Configuration Example of Tag Apparatus 300)

The functional configuration example of the imaging control apparatus 200 according to the present embodiment has been described above. Subsequently, a functional configuration example of the tag apparatus 300 according to the present embodiment will be described with reference to FIG. 11.

Figure 11:
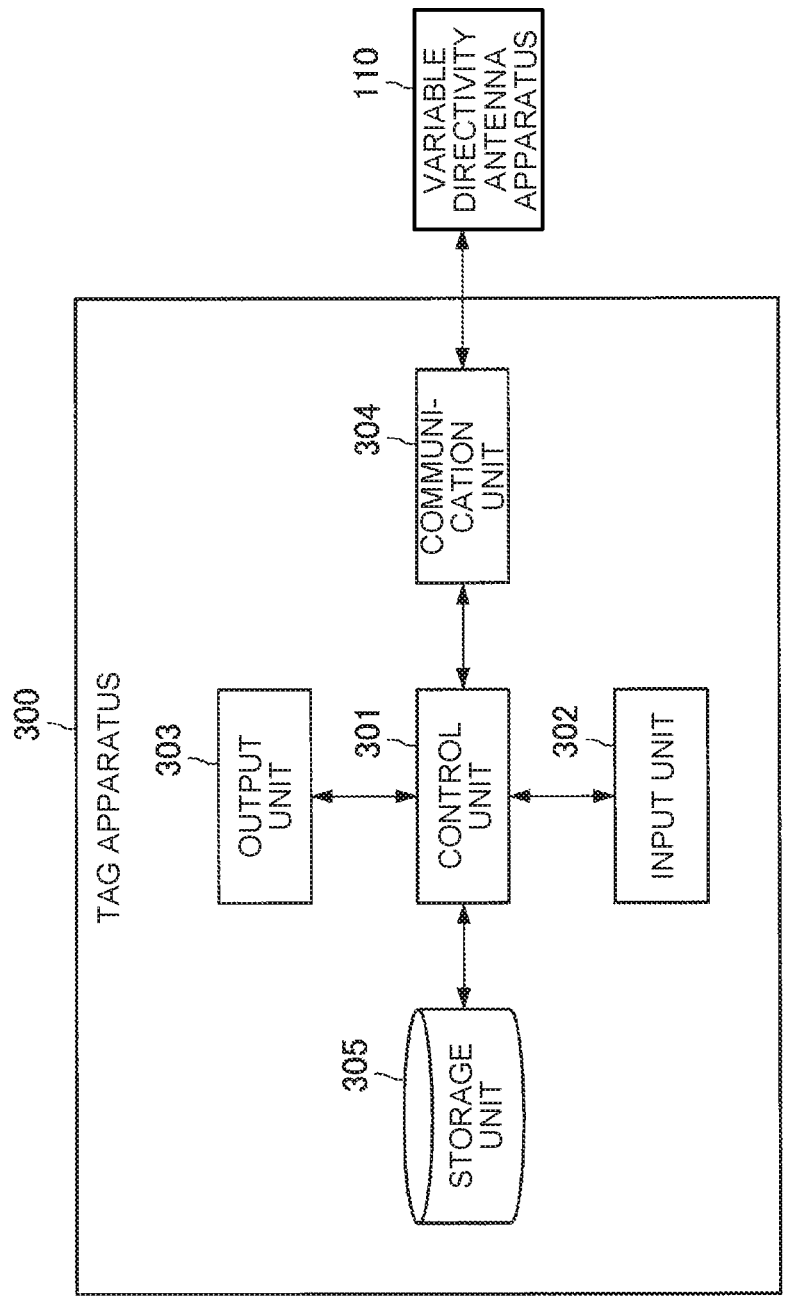
FIG. 11 is a block diagram illustrating a functional configuration example of a tag apparatus 300.

As illustrated in FIG. 11, the tag apparatus 300 includes a control unit 301, an input unit 302, an output unit 303, a communication unit 304, and a storage unit 305.

(Control Unit 301)

The control unit 301 is a functional component which generally controls overall processing to be performed by the tag apparatus 300. For example, the control unit 301 can control activation and stop of respective components including the output unit 303 such as a display and a speaker on the basis of input, or the like, performed using the input unit 302. Note that control content of the control unit 301 is not limited to these. For example, the control unit 301 may control processing which is typically performed at a smartphone, a tablet PC, a wearable apparatus, or the like.

(Input Unit 302)

The input unit 302 is a functional component which accepts input. For example, the input unit 302 includes input means such as a touch panel, a button, a switch and a microphone, and the user can perform control of the tag apparatus 300 by using these kinds of input means. The input unit 302 provides the input content to the control unit 301. Note that the input means provided at the input unit 302 is not particularly limited.

(Output Unit 303)

The output unit 303 is a functional component which outputs various kinds of information. For example, the output unit 303 includes display means such as a display, sound output means such as a speaker, vibration generating means such as a vibration motor, or the like, and realizes display of predetermined information by the display, or the like, or sound output by the speaker, or the like, or realizes generation of vibration by activation of the vibration motor on the basis control by the control unit 301. Note that the output means provided at the output unit 303 is not particularly limited.

(Communication Unit 304)

The communication unit 304 is a functional component which controls wireless communication with the variable directivity antenna apparatus 110. More specifically, in a case where the tag apparatus 300 is activated, the communication unit 304 transmits a wireless signal which makes a notification of the tag ID. Note that a transmission frequency, a timing, or the like, of the wireless signal are not particularly limited. Further, information to be communicated by the communication unit 304 and a case where the communication unit 304 performs communication are not limited to these.

(Storage Unit 305)

The storage unit 305 is a functional component which stores various kinds of information. For example, the storage unit 305 stores a tag ID or the like, or stores a program, a parameter, or the like, to be used by respective functional components of the tag apparatus 300. Note that the information stored in the storage unit 305 is not limited to these.

The functional configuration example of the tag apparatus 300 has been described above. Note that the functional components described above using FIG. 11 are merely an example, and the functional components of the tag apparatus 300 are not limited to the example. For example, the tag apparatus 300 does not necessarily have to include all the functional components illustrated in FIG. 11. Further, the functional components of the tag apparatus 300 can be flexibly transformed in accordance with specifications and operation.

(1.6. Example of Processing Flow)

The functional configuration example of the tag apparatus 300 according to the present embodiment has been described above. Subsequently, a functional configuration example of a processing flow by the imaging apparatus 100 will be described with reference to FIG. 12.

Figure 12:
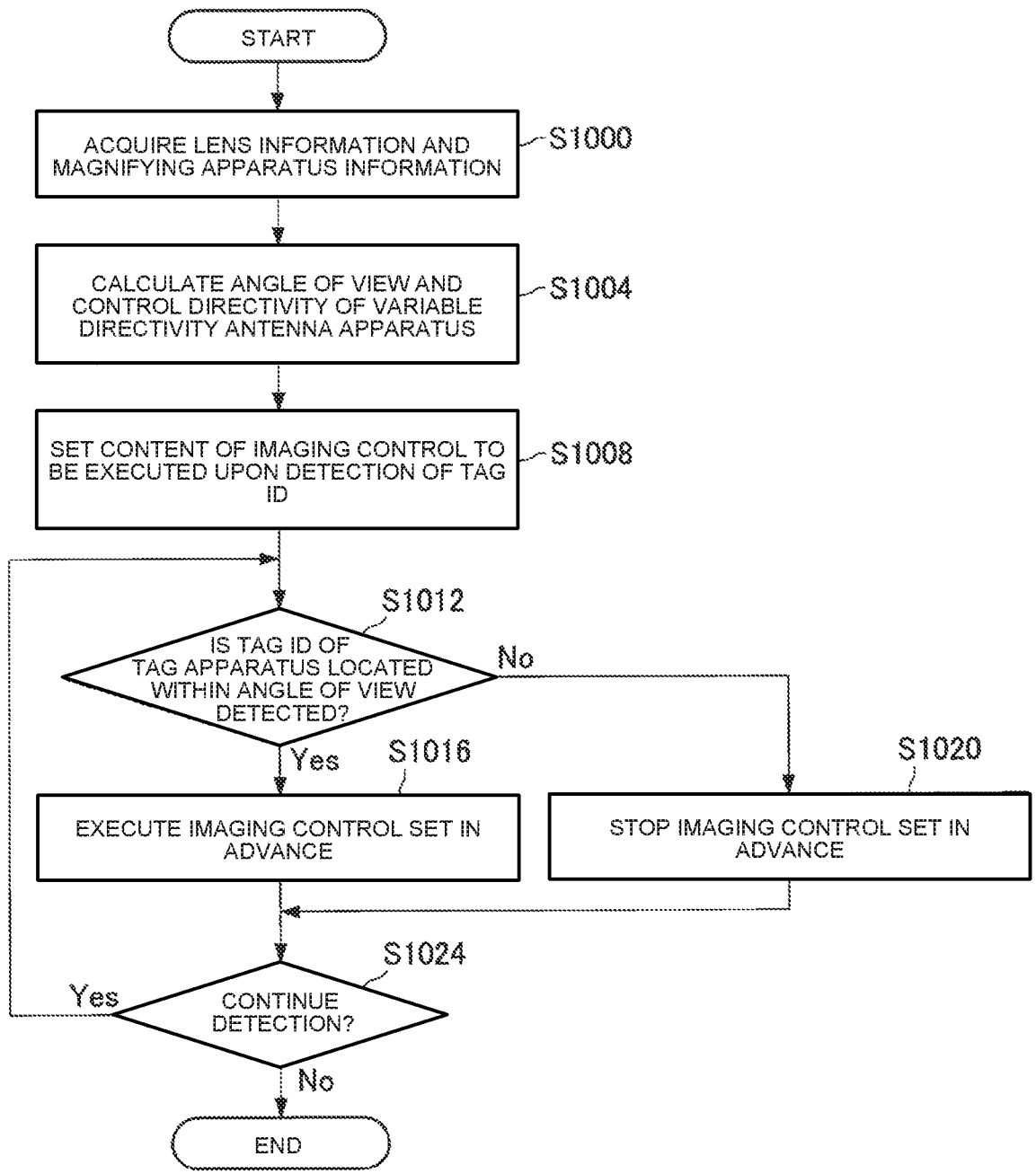
FIG. 12 is a flowchart illustrating an example of imaging processing flow by the imaging apparatus 100.

In Step S1000 in FIG. 12, the information input unit 101 of the imaging apparatus 100 acquires the lens information and the magnifying apparatus information by performing predetermined communication with the information output unit 121 of the lens 120 and the information output unit 131 of the magnifying optical apparatus 130.

In Step S1004, the control unit 102 of the imaging apparatus 100 calculates the angle of view on the basis of the lens information and the magnifying apparatus information. Then, the control unit 102 determines the communication range (such as an angle at which communication is possible) of the variable directivity antenna apparatus 110 on the basis of the angle of view, generates control information for making a notification of the determined content, and provides the control information to the variable directivity antenna apparatus 110, to thereby control the communication range of the variable directivity antenna apparatus 110.

In Step S1008, the control unit 102 sets in advance content of imaging control to be executed in a case where the tag ID of the tag apparatus 300 located within the angle of view is detected. For example, by the user setting content of imaging control using the imaging control apparatus 200, the imaging control apparatus 200 provides the setting information to the imaging apparatus 100, and the control unit 102 of the imaging control apparatus 200 sets content of the imaging control on the basis of the setting information.

Then, after imaging processing is started, the control unit 102 determines whether or not the tag apparatus 300 is located within the angle of view on the basis of the information regarding the estimation result of the position of the tag apparatus 300 provided from the reception information processing unit 112 of the variable directivity antenna apparatus 110 (in other words, the control unit 102 tries detection of the tag ID of the tag apparatus 300 located within the angle of view). Then, in a case where the control unit 102 detects the tag ID of the tag apparatus 300 located within the angle of view (Step S1012: Yes), in Step S1016, the control unit 102 executes imaging control based on the tag ID, set in advance. For example, the control unit 102 executes video correction processing and the like such as white balance processing, luminance processing or blur correction processing and the like on the captured video data.

In Step S1012, in a case where the tag ID of the tag apparatus 300 located within the angle of view, which has been continuously detected so far, is no longer detected, or in a case where the tag apparatus 300 corresponding to the detected tag ID goes off the angle of view (Step S1012: No), in Step S1020, the control unit 102 stops imaging control based on the tag ID which has been executed so far.

Then, in a case where processing of detecting the tag ID is continued (in other words, in a case where imaging processing is continued, step S1024: Yes), the processing returns to step S1012, and the control unit 102 continuously performs processing of detecting the tag ID of the tag apparatus 300 located within the angle of view.

Note that respective Steps in the flowchart illustrated in FIG. 12 do not necessarily have to be processed in chronological order along the described order. That is, the respective steps in the flowchart may be processed in order different from the described order or may be processed in parallel.

2. Second Embodiment

The first embodiment according to the present disclosure has been described above. Subsequently, a second embodiment according to the present disclosure will be described.

The second embodiment according to the present disclosure is an embodiment in which captured image data generated by a plurality of imaging apparatuses 100 is switched on the basis of the detected tag ID and a reception status of the detected wireless signal. A configuration example of an imaging system according to the present embodiment will be described first with reference to FIG. 13.

Figure 13:
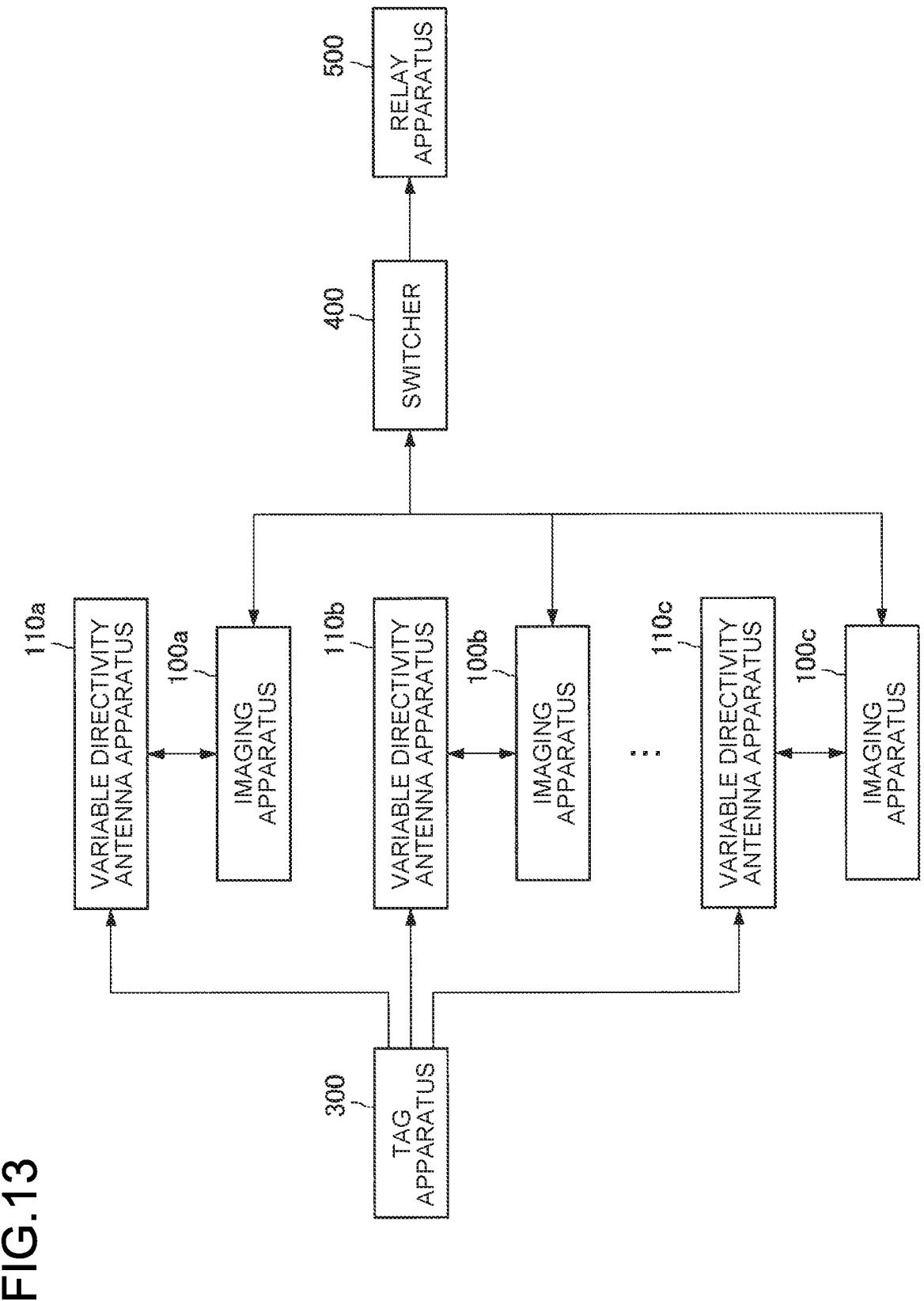
FIG. 13 is a view illustrating a configuration example of an imaging system according to a second embodiment.

As illustrated in FIG. 13, the imaging system according to the present embodiment includes a plurality of imaging apparatuses 100 (in the drawing, imaging apparatuses 100a to 100c are illustrated), variable directivity antenna apparatuses 110 respectively connected to the respective imaging apparatuses 100 (in the drawing, variable directivity antenna apparatuses 110a to 110c are illustrated), a tag apparatus 300, a switcher 400, and a relay apparatus 500. Note that, while description is omitted for descriptive purpose, it is assumed that the imaging control apparatus 200 is also provided.

The switcher 400 is an apparatus which switches the captured image data on the basis of the detected tag ID and a reception status of the detected wireless signal. More specifically, the user sets in advance the tag ID to be used for switching, at the switcher 400. Note that a setting method is not particularly limited, and, for example, the user may perform the setting using the imaging control apparatus 200, or the like.

Then, in a case where imaging processing is started, each imaging apparatus 100 provides the tag ID of the tag apparatus 300 detected within the angle of view, received strength information of the detected wireless signal and the captured image data to the switcher 400. Then, the switcher 400 recognizes whether or not there is a tag ID to be used for switching and the imaging apparatus 100 which has detected a wireless signal with the highest received strength among the imaging apparatuses 100 which have detected the wireless signal including the tag ID (in other words, the imaging apparatus 100 located closest to the tag apparatus 300) on the basis of the tag ID and the received strength information of the wireless signal provided from each imaging apparatus 100. Then, the switcher 400 provides the captured image data of the imaging apparatus 100 which has detected the wireless signal with the highest received strength to the relay apparatus 500.

The relay apparatus 500 is an apparatus which performs processing regarding relay broadcasting using the captured image data provided from the switcher 400. For example, the relay apparatus 500 converts the captured image data into data for relay broadcasting, or transfers the captured image data to another relay apparatus 500. Note that content of the processing by the relay apparatus 500 is not particularly limited.

Figure 14:
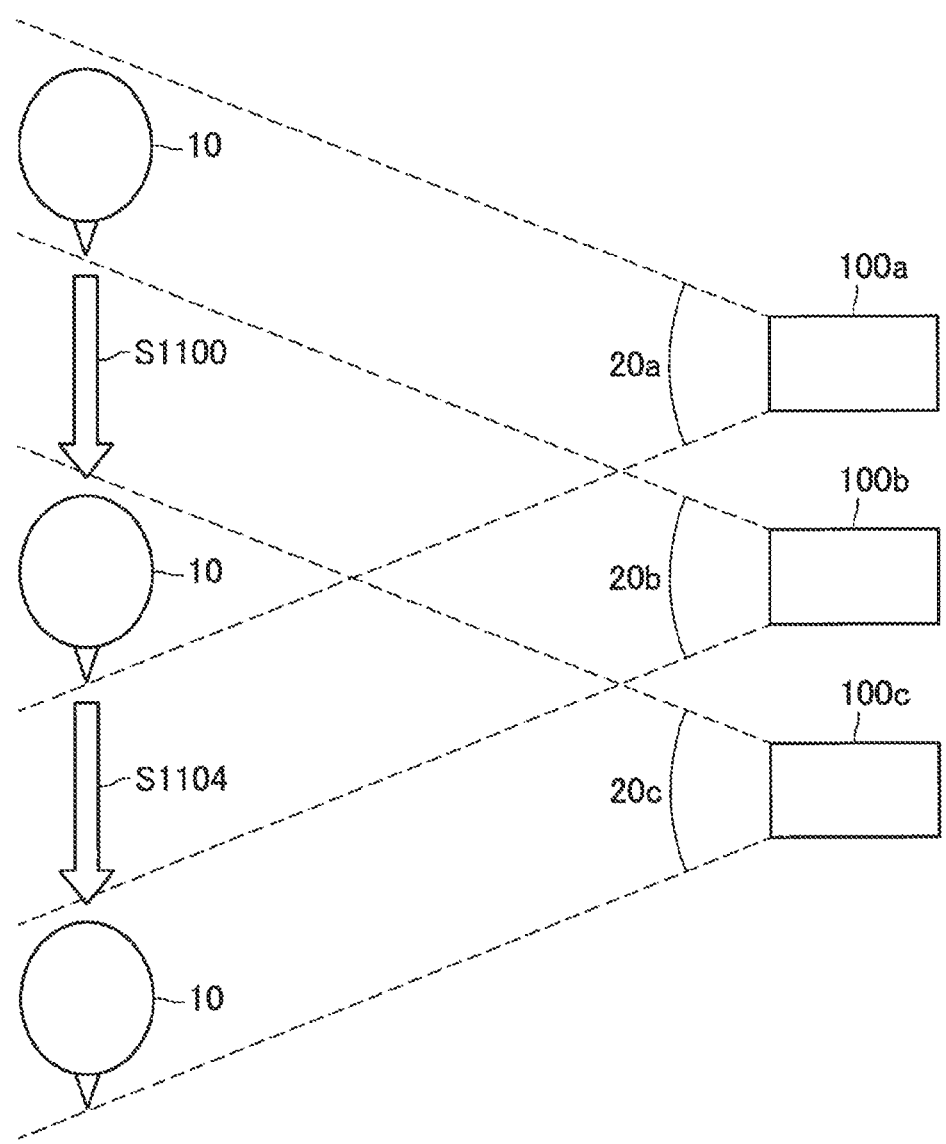
FIG. 14 is a conceptual diagram of the second embodiment.

Subsequently, a specific example of switching of the captured image data based on the detected tag ID and the reception status of the detected wireless signal will be described with reference to FIG. 14. As illustrated in an upper part of FIG. 14, it is assumed that the subject 10 is located within an angle of view 20a of the imaging apparatus 100a (not that, for descriptive purpose, the imaging control apparatus 200, the tag apparatus 300, the variable directivity antenna apparatus 110 and an angle at which communication is possible of the variable directivity antenna apparatus 110, the switcher 400 and the relay apparatus 500 are omitted). In this case, because only the imaging apparatus 100a detects the tag apparatus 300 within the angle of view, the switcher 400 provides the captured image data generated by the imaging apparatus 100a to the relay apparatus 500.

Subsequently, in Step S1100, it is assumed that the subject 10 moves to a middle part in FIG. 14. In this case, while all of the imaging apparatuses 100a to 100c detect the tag apparatus 300 within the angle of view, because the variable directivity antenna apparatus 110 connected to the imaging apparatus 100b detects a wireless signal having the highest received strength, the switcher 400 switches the captured image data to be provided so as to provide the captured image data generated by the imaging apparatus 100b to the relay apparatus 500.

Subsequently, in Step S1104, it is assumed that the subject 10 moves to a lower part in FIG. 14. In this case, because only the imaging apparatuses 100c detects the tag apparatus 300 within the angle of view, the switcher 400 switches the captured image data to be provided so as to provide the captured image data generated by the imaging apparatus 100c to the relay apparatus 500.

As described above, in the second embodiment, it is possible to autonomously switch the captured image data generated by the most appropriate imaging apparatus 100 among a plurality of imaging apparatuses 100 on the basis of the detected tag ID and the reception status of the detected wireless signal. Conventionally, for example, the user has manually performed switching work, or has performed editing such as connection of the captured image data generated by a plurality of imaging apparatuses 100 after imaging. Meanwhile, because the switcher 400 according to the present embodiment can autonomously switch the captured image data, it is possible to reduce burden of the user. For example, the present embodiment enables imaging using a plurality of imaging apparatuses 100 by one user (or a few users) and switching of the captured image data in real time.

Note that, while, in the above description, the switcher 400 functions as a master in a master-slave scheme, one of the plurality of imaging apparatuses 100 may function as a master, and the switcher 400 may function as a slave. In this case, the user sets in advance the tag ID to be used for switching at the imaging apparatus 100 which functions as a master (hereinafter, referred to as a "master imaging apparatus 100").

Then, in a case where imaging processing is started, each imaging apparatus 100 provides the tag ID of the tag apparatus 300 detected within the angle of view and the received strength information of the detected wireless signal to the master imaging apparatus 100, and provides the captured image data to the switcher 400. Then, the master imaging apparatus 100 recognizes whether or not there is the tag ID to be used for switching and the imaging apparatus 100 which has detected the wireless signal having the highest received strength among the imaging apparatuses 100 which have detected the wireless signal including the tag ID on the basis of the tag ID and the received strength information of the wireless signal provided from each imaging apparatus 100. Then, the master imaging apparatus 100 notifies the switcher 400 of the imaging apparatus 100 which has detected the wireless signal having the highest received strength. Then, the switcher 400 provides the captured image data of the imaging apparatus 100 to the relay apparatus 500. Note that an apparatus other than the imaging apparatus 100 and the switcher 400 (such as, for example, the imaging control apparatus 200) may function as the master.

Note that the above description is merely an example, and processing content of the second embodiment according to the present disclosure can be changed as appropriate. For example, it is also possible to switch the captured image data to the captured image data of the imaging apparatus 100 which has detected the wireless signal having received strength within a predetermined range instead of the imaging apparatus 100 which has detected the wireless signal having the highest received strength.

3. Third Embodiment

The second embodiment according to the present disclosure has been described above. Subsequently, a third embodiment according to the present disclosure will be described.

The third embodiment according to the present disclosure is an embodiment in which captured image data generated by a plurality of imaging apparatuses 100 is switched on the basis of not only the detected tag ID and a reception status of the wireless signal but also speech to be emitted from the subject. A configuration example of an imaging system according to the present embodiment will be described first with reference to FIG. 15.

Figure 15:
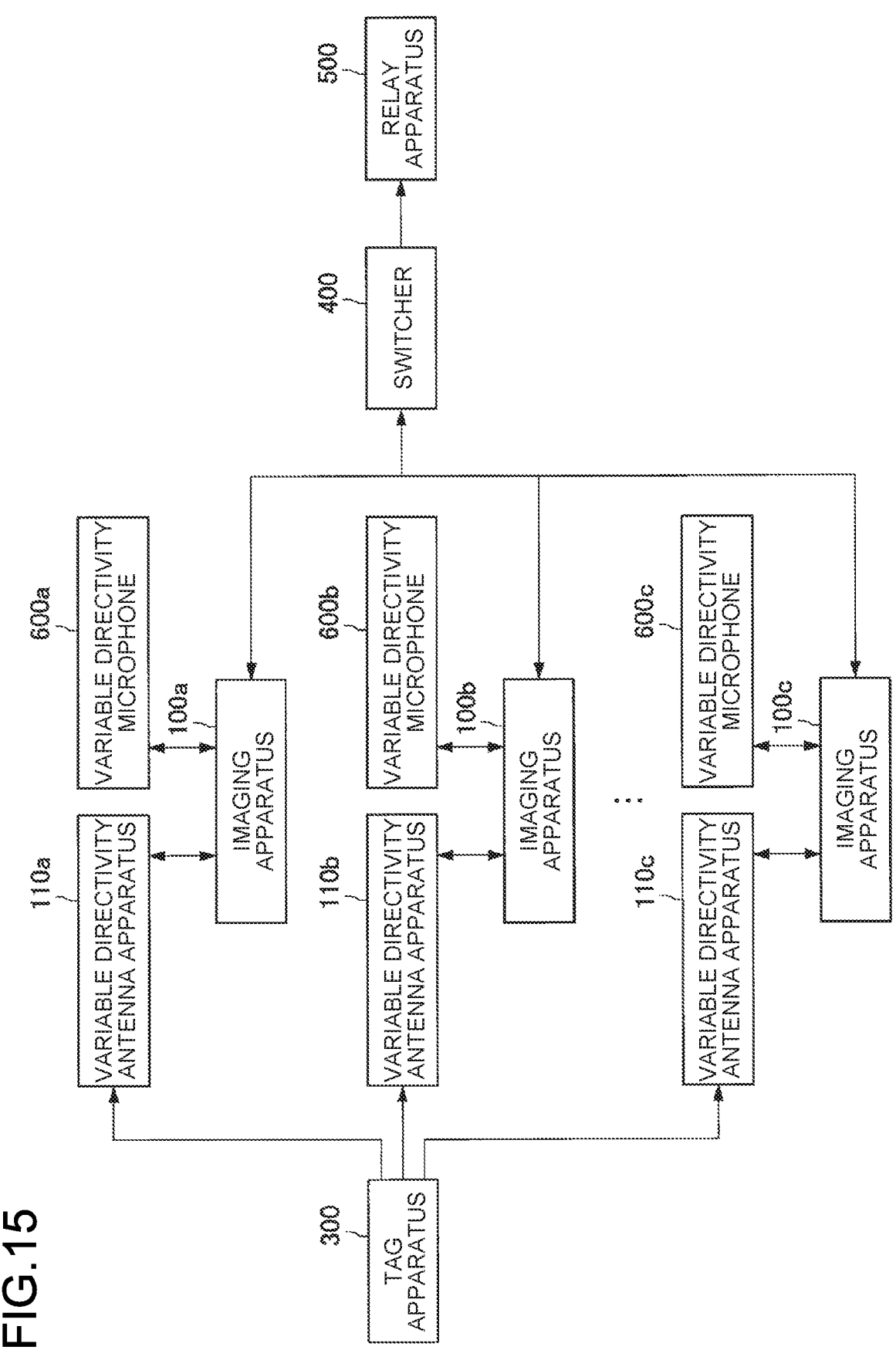
FIG. 15 is a view illustrating a configuration example of an imaging system according to a third embodiment.

As illustrated in FIG. 15, the imaging system according to the present embodiment includes a plurality of imaging apparatuses 100 (in the drawing, imaging apparatuses 100a to 100c are illustrated), variable directivity antenna apparatuses 110 respectively connected to the respective imaging apparatuses 100 (in the drawing, variable directivity antenna apparatuses 110a to 110c are illustrated) and a variable directivity microphone 600 (in the drawing, variable directivity microphones 600a to 600c), a tag apparatus 300, a switcher 400, and a relay apparatus 500. Note that, while description is omitted for descriptive purpose, it is assumed that the imaging control apparatus 200 is also provided.

The variable directivity microphone 600 is an apparatus which functions as a sound collecting unit which has a sound collection range corresponding to the imaging range of the imaging apparatus 100 (or the communication range of the variable directivity antenna apparatus 110). Further, because the variable directivity microphone 600 can change a sound collection direction to an arbitrary direction by control by the control unit 102 of the imaging apparatus 100, it is possible to cause the sound collection range to coordinate with the imaging range (or the communication range). For example, the variable directivity microphone 600 may have an angle at which sound can be collected in a similar manner to the angle at which communication is possible 30 of the variable directivity antenna apparatus 110, illustrated in FIG. 2 and FIG. 3. In the present embodiment, the variable directivity microphone 600 provides information regarding collected sound (hereinafter, referred to as "collected sound information") to the imaging apparatus 100.

In the present embodiment, the user sets in advance the tag ID to be used for switching and characteristic information of speech to be emitted from the subject (such as, for example, speech of a performer or the like) at the switcher 400. Note that a setting method is not particularly limited, and, for example, the user may perform the setting using the imaging control apparatus 200, or the like.

Then, in a case where imaging processing is started, each imaging apparatus 100 provides the tag ID of the tag apparatus 300 detected within the angle of view, received strength information of the detected wireless signal, the collected sound information, and the captured image data to the switcher 400. Then, the switcher 400 recognizes whether or not there is a tag ID to be used for switching and the imaging apparatus 100 which has detected the wireless signal having the received strength within a predetermined range (or the wireless signal having the highest received strength) among the imaging apparatuses 100 which have detected the wireless signal including the tag ID on the basis of the tag ID and the received strength information of the wireless signal provided from each imaging apparatus 100. Further, the switcher 400 judges whether or not the collected sound is speech emitted from the subject, set in advance by extracting characteristic information of collected sound information and comparing the characteristic information with the characteristic information set in advance. Then, the switcher 400 provides the captured image data of the imaging apparatus 100 which has detected a predetermined tag ID, which has detected the wireless signal having received strength included in a predetermined range, and which has detected speech emitted from the subject, set in advance, to the relay apparatus 500.

Figure 16:
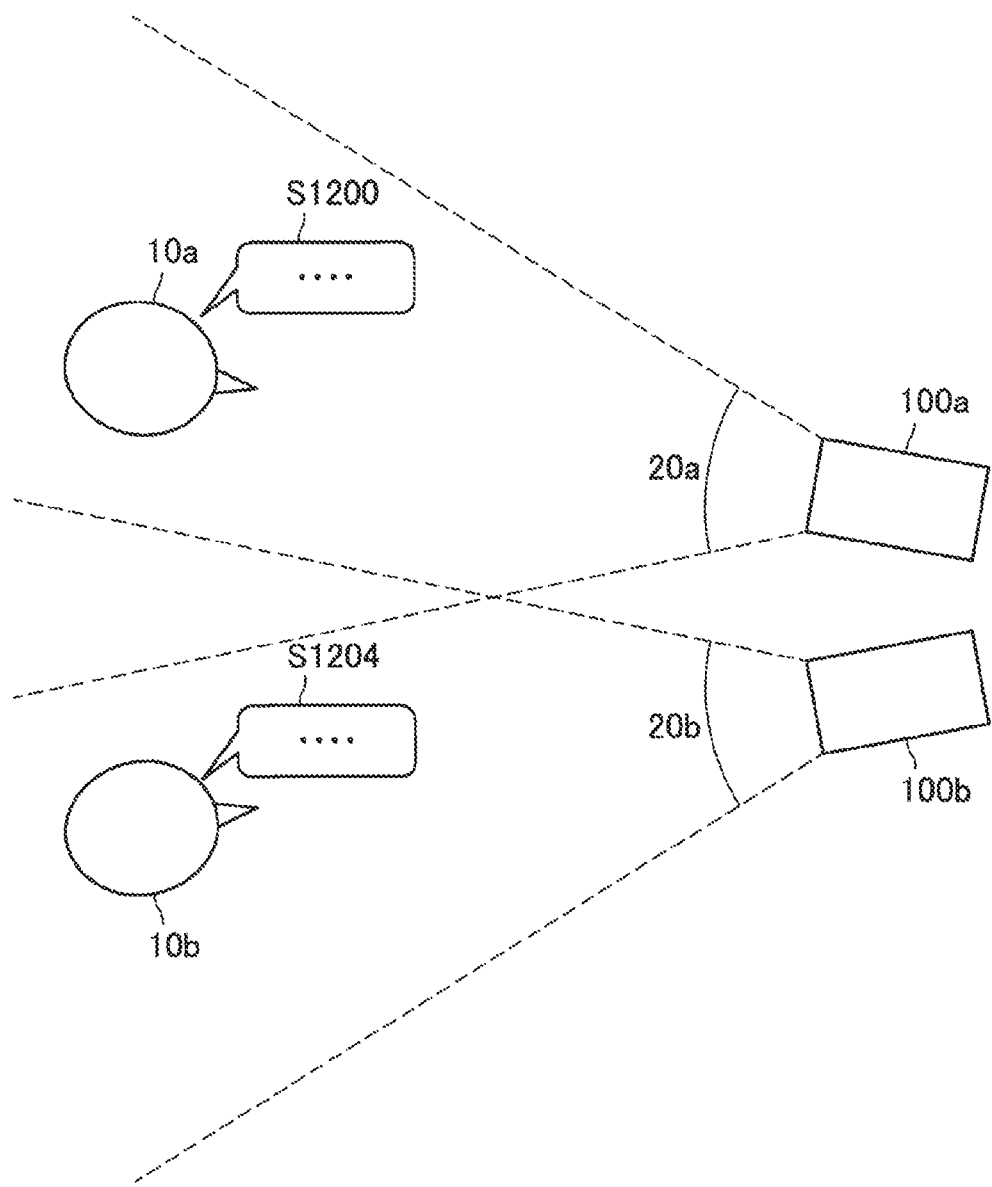
FIG. 16 is a conceptual diagram of the third embodiment.

Subsequently, a specific example of switching of the captured image data also based on the speech emitted from the subject will be described with reference to FIG. 16. FIG. 16 illustrates an example in a case where the imaging apparatus 100a and the imaging apparatus 100b capture an image of a scene of conversation between a subject 10a and a subject 10b (note that, for descriptive purpose, the imaging control apparatus 200, the tag apparatus 300, the variable directivity antenna apparatus 110, an angle at which communication is possible of the variable directivity antenna apparatus 110, the variable directivity microphone 600, an angle at which sound can be collected of the variable directivity microphone 600, the switcher 400 and the relay apparatus 500 are omitted).

It is assumed that the subject 10a is located within the angle of view 20a of the imaging apparatus 100a, and the subject 10b is located within the angle of view 20b of the imaging apparatus 100b. In this situation, it is assumed that, in Step S1200, the subject 10a emits speech. By the variable directivity microphone 600 connected to the imaging apparatus 100a providing collected sound information regarding the speech to the switcher 400, the switcher 400 recognizes that the subject 10a emits speech, and switches the captured image data to be provided so as to provide the captured image data generated by the imaging apparatus 100a to the relay apparatus 500.

Thereafter, it is assumed that, in Step S1204, the subject 10b emits speech in response to a question from the subject 10a. By the variable directivity microphone 600 connected to the imaging apparatus 100b providing collected sound information regarding the speech to the switcher 400, the switcher 400 recognizes that the subject 10b emits speech, and switches the captured image data to be provided so as to provide the captured image data generated by the imaging apparatus 100b to the relay apparatus 500.

As described above, in the third embodiment, it is possible to autonomously switch the captured image data on the basis of the speech emitted from the subject as well as the detected tag ID and the reception status of the detected wireless signal. By this means, for example, the user can make setting such that switching is not performed unless the subject 10 emits speech, or the like, even if the subject 10 who wears the tag apparatus 300 comes in the angle of view of the imaging apparatus 100. Further, the user can set a condition of switching control of the captured image data in more detail by setting content (such as, for example, lines and a keyword) or characteristics (such as, for example, a volume of speech, a frequency of speech and a length of speech) of the speech of the subject 10.

Further, in a case where imaging is performed in an environment where an obstacle exists, there is a case where received strength of the wireless signal detected by the variable directivity antenna apparatus 110 becomes weak as a result of the wireless signal transmitted from the tag apparatus 300 being blocked by the obstacle. In this case, regardless of the subject 10 existing within the angle of view, there is a possibility that the imaging apparatus 100 may cause malfunction as a result of judging that the subject 10 does not exist within the angle of view. Meanwhile, in the present embodiment, because the imaging apparatus 100 performs control also on the basis of the speech emitted from the subject, it is possible to switch the captured image data with higher accuracy even in an environment where the wireless signal cannot be appropriately detected.

Note that the above description is merely an example, and the processing content of the third embodiment according to the present disclosure can be changed as appropriate. For example, also concerning the third embodiment, an apparatus which functions as a master and an apparatus which functions as a slave in a master-slave scheme are not particularly limited. Further, arbitrary imaging control (such as, for example, start or end of imaging, and video correction processing such as white balance processing) may be realized also on the basis of the speech emitted from the subject by the third embodiment being applied to the first embodiment.

4. Fourth Embodiment

The third embodiment according to the present disclosure has been described above. Subsequently, a fourth embodiment according to the present disclosure will be described.

The fourth embodiment according to the present disclosure is an embodiment in which the subject 10 is tracked on the basis of the detected tag ID. A configuration example of an imaging system according to the present embodiment will be described first with reference to FIG. 17.

Figure 17:
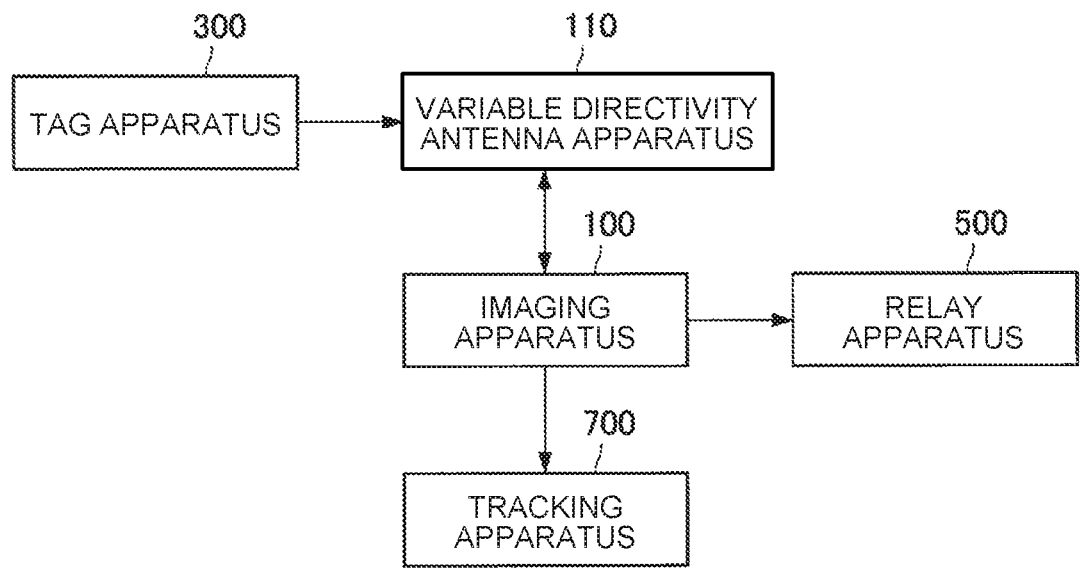
FIG. 17 is a view illustrating a configuration example of an imaging system according to a fourth embodiment.

As illustrated in FIG. 17, the imaging system according to the present embodiment includes the imaging apparatus 100, the variable directivity antenna apparatus 110 connected to the imaging apparatus 100, the tag apparatus 300, the relay apparatus 500, and a tracking apparatus 700. Note that, while description is omitted for descriptive purpose, it is assumed that the imaging control apparatus 200 is also provided.

The tracking apparatus 700 is an apparatus (such as, for example, a camera platform) at which the imaging apparatus 100 is provided. Further, the tracking apparatus 700 can perform communication with the imaging apparatus 100 and can change an imaging direction of the imaging apparatus 100 by operating on the basis of the control information from the imaging apparatus 100.

In the present embedment, the user sets in advance a tag ID to be used for tracking at the imaging apparatus 100. Note that a setting method is not particularly limited, and, for example, the user may perform the setting using the imaging control apparatus 200, or the like.

Then, in a case where imaging processing is started, the imaging apparatus 100 acquires information regarding a tag ID and an estimation result of a position (or a direction) of the detected tag apparatus 300 from the variable directivity antenna apparatus 110. Then, in a case where the tag ID to be used for tracking is detected, by the imaging apparatus 100 generating control information for changing the imaging direction so as to track the position (or the direction) of the tag apparatus 300, and providing the control information to the tracking apparatus 700, the tracking apparatus 700 changes the imaging direction of the imaging apparatus 100 on the basis of the control information. For example, the imaging apparatus 100 controls the imaging direction so that the position of the tag apparatus 300 is included at the center of the angle of view or within a predetermined range at the angle of view. Then, the imaging apparatus 100 provides the captured image data to the relay apparatus 500.

Subsequently, a specific example of tracking of the subject 10 based on the detected tag ID will be described with reference to FIG. 18. As illustrated in an upper part of FIG. 18, it is assumed that the tag apparatus 300 worn by the subject 10 is located at the center of the angle of view of the imaging apparatus 100. Note that, in the drawing, a line indicating the center of the angle of view (hereinafter, referred to as a "center line 80") is indicated, and it is assumed that the tag apparatus 300 worn by the subject 10 is located on the center line 80 (further, for descriptive purpose, the imaging control apparatus 200, the tag apparatus 300, the variable directivity antenna apparatus 110, the angle at which communication is possible of the variable directivity antenna apparatus 110, the relay apparatus 500, and the tracking apparatus 700 are omitted).

Figure 18:
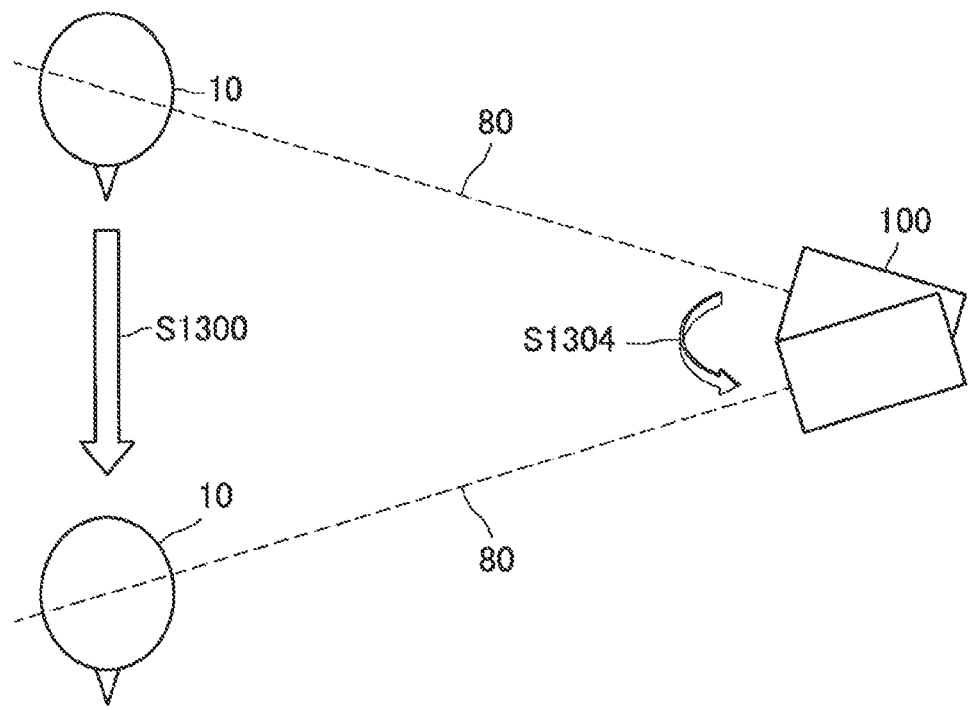
FIG. 18 is a conceptual diagram of the fourth embodiment.

In this situation, it is assumed that, in Step S1300, the subject 10 moves to a lower part of FIG. 18. In this case, the imaging apparatus 100 generates control information for changing the imaging direction so that the center line 80 is caused to track the position of the tag apparatus 300 worn by the subject 10, and provides the control information to the tracking apparatus 700. By this means, in Step S1304, the tracking apparatus 700 operates, and causes the imaging direction to track the tag apparatus 300 worn by the subject 10.

As described above, in the fourth embodiment, it is possible to autonomously track the tag apparatus 300 worn by the subject 10 on the basis of the detected tag ID. Conventionally, for example, the user has tracked the subject 10 by manually changing the imaging direction of the imaging apparatus 100. Meanwhile, because the imaging apparatus 100 and the tracking apparatus 700 according to the present embodiment can autonomously track the tag apparatus 300 worn by the subject 10, it is possible to reduce burden of the user. For example, the present embodiment enables imaging using a plurality of imaging apparatuses 100 by one user (or a few users).

Note that the above description is merely an example, and the processing content of the fourth embodiment according to the present disclosure can be changed as appropriate. For example, while, in the above description, the imaging apparatus 100 controls operation of the tracking apparatus 700, the tracking apparatus 700 may control itself. More specifically, the tracking apparatus 700 may acquire the information regarding the tag ID and the estimation result of the position (or the direction) of the detected tag apparatus 300 from the imaging apparatus 100 and may operate so as to cause the imaging direction to track the position (or the direction) of the tag apparatus 300.

5. Modified Examples

The fourth embodiment according to the present disclosure has been described above. Subsequently, modified examples of the present disclosure will be described.

(5.1. Use of a Plurality of Tag Apparatuses 300)

While a case has been mainly described above where one tag apparatus 300 is used, a plurality of tag apparatuses 300 may be used. Therefore, as a first modified example, various functions which can be realized in a case where a plurality of tag apparatuses 300 is used will be described.

First, a scene estimation function by a plurality of tag apparatuses 300 being used will be described with reference to FIG. 19. FIG. 19 is a table indicating correspondence relationship between a scene in the captured image data and a target for which an image is to be captured in each scene (such as, for example, a performer or a background set). For example, in a scene 1, it is indicated that an image of "Object1" and "Object3" is captured. Note that it is assumed that the targets for which an image is to be captured wear tag apparatuses 300 having tag IDs which are different from each other.

In a case where a plurality of tag apparatuses 300 is used for imaging, as described above, the control unit 102 of the imaging apparatus 100 records tag IDs of the respective tag apparatuses 300 in predetermined file data (for example, extensible markup language (XML) file data) and associates the file data with the captured image data. Then, in the modified example, the scene for which an image is captured may be estimated by using the file data and the table in FIG. 19.

More specifically, a scene estimating unit which estimates a scene for imaging may be further provided. For example, the scene estimating unit can estimate a scene for which an image is captured by matching combination of targets for which an image is to be captured corresponding to the tag apparatuses 300 indicated in the file data against the table in FIG. 19. For example, in a case where targets for which an image is to be captured corresponding to the tag apparatuses 300 indicated in the file data are "Object2" and "Object3", the scene estimating unit can estimate that the scene for which an image is captured is a "scene 4".

By this means, the user can more smoothly search for a desired scene from the captured image data. Note that the scene estimating unit may be provided at any apparatus. For example, the scene estimating unit may be provided at the imaging apparatus 100, the imaging control apparatus 200, the tag apparatus 300 or other external apparatuses. Further, the control unit 102 of the imaging apparatus 100, the control unit 201 of the imaging control apparatus 200, the control unit 301 of the tag apparatus 300, or the like, may function as the scene estimating unit. Further, while it is assumed that there is a plurality of tag IDs to be used for estimating a scene, there may be one tag ID. Further, the control unit 102 of the imaging apparatus 100 may perform various kinds of imaging control described above on the basis of the scene estimated by the scene estimating unit.

Subsequently, an autonomous framing function by a plurality of tag apparatuses 300 being used will be described with reference to FIG. 20. The imaging apparatus 100 can autonomously control the angle of view, zoom magnification, or the like, on the basis of detection directions (or detection positions) of the tag apparatuses 300.

Figure 20:
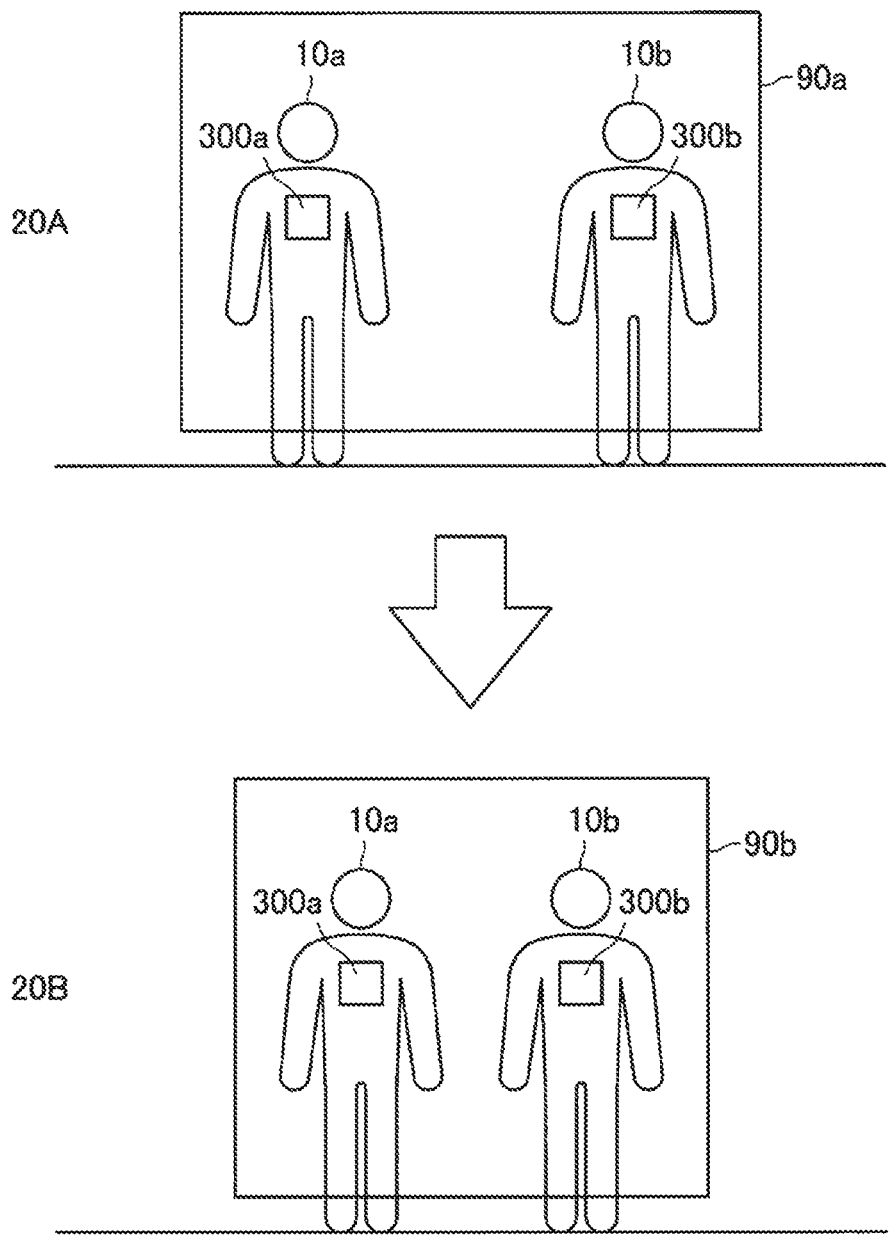
FIG. 20 is a view for explaining an autonomous framing function to be realized by a plurality of tag apparatuses 300 being used.

For example, as illustrated in 20A in FIG. 20, the imaging apparatus 100 captures an image of a range 90a by controlling the angle of view, the zoom magnification, or the like, so as to capture an image of the subject 10a who wears the tag apparatus 300a and the subject 10b who wears the tag apparatus 300b. For example, the variable directivity antenna apparatus 110 estimates positions of the respective tag apparatuses 300 on the basis of received strength of wireless signals from the respective tag apparatuses 300, and the imaging apparatus 100 controls the angle of view, the zoom magnification, or the like, on the basis of estimated positions of the respective tag apparatuses 300.

Thereafter, as illustrated in 20B, in a case where the subject 10a and the subject 10b come close to each other, in a method similar to the above-described method, the variable directivity antenna apparatus 110 estimates the positions of the respective tag apparatuses 300, and the imaging apparatus 100 captures an image of a range 90b by changing the angle of view, the zoom magnification, or the like, on the basis of the estimated positions of the respective tag apparatuses 300.

Conventionally, for example, because the user has manually performed framing, it has been impossible to track quick movement of the subject 10, and there has been a case where the subject 10 has gone off the angle of view. Meanwhile, in the modified example, if accuracy of processing of estimating the position of the subject 10 is high, and processing speed is high, the imaging apparatus 100 can track also quick movement of the subject 10, and can autonomously perform appropriate framing. Note that, while a case has been described above where a plurality of tag apparatuses 300 is used, framing may be performed on the basis of one tag apparatus 300.

Further, in a case where the imaging apparatus 100 performs imaging control on the basis of the detected plurality of tag IDs, there is a case where content of the imaging control set in advance conflicts. For example, such a case includes a case where content of imaging control set for the plurality of tag IDs is adjustment of white balance, and setting values of white balance for the respective tag IDs are different from each other, or the like. In a case where content of imaging control conflicts among a plurality of tag IDs, there is a possibility that the user uses a wrong tag apparatus 300, or wrong content of imaging control is set for each tag ID. Therefore, in this case, the imaging apparatus 100 can prevent imaging control which is not intended by the user by executing none of the imaging control. Further, the imaging apparatus 100 may notify the user of an error using a predetermined method.

Note that a method for addressing a case where content of imaging control set at the detected tag IDs conflicts is not limited to the above-described method. For example, the user may set priority for content of imaging control based on the tag IDs, so that, in a case where the content of imaging control conflicts, imaging control with higher priority is executed.

(5.2. Prevention of Malfunction Due to Change of Communication Range)

Next, a function for preventing malfunction due to change of a communication range of the variable directivity antenna apparatus 110 will be described.

Figure 21:
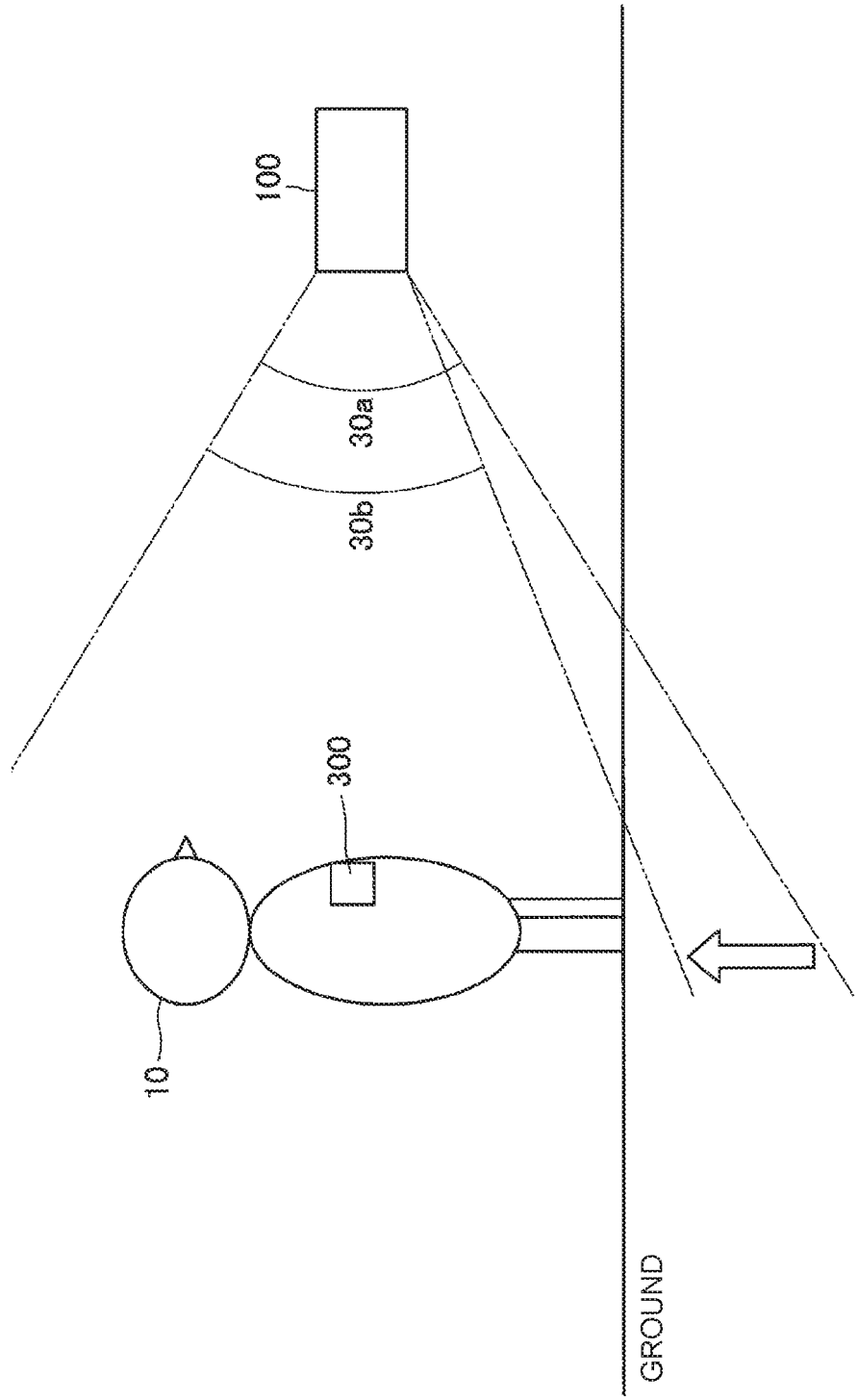
FIG. 21 is a view for explaining a function for preventing malfunction due to change of a communication range of the variable directivity antenna apparatus 110.

There is a case where wireless communication between the tag apparatus 300 and the variable directivity antenna apparatus 110 is more likely to be failed depending on an imaging environment. For example, as illustrated in FIG. 21, in a case where an image of the subject 10 who stands on the ground is captured, it is assumed that the ground is formed with a material which is likely to reflect a wireless signal transmitted from the tag apparatus 300. In this case, as a result of a direct wave which directly reaches the variable directivity antenna apparatus 110 from the tag apparatus 300 and a reflected wave which reaches after being reflected on the ground interfering with each other, there is a possibility that the variable directivity antenna apparatus 110 may fail in reception of the wireless signal, and the imaging apparatus 100 may cause malfunction.

Therefore, in the present modified example, it is also possible to prevent a failure of wireless communication by changing the communication range of the variable directivity antenna apparatus 110. More specifically, in a case where it is judged that a communication environment is poor, the variable directivity antenna apparatus 110 can prevent a failure of wireless communication by changing the communication range so as to avoid a range which is a cause of the poor communication environment. For example, in FIG. 21, the variable directivity antenna apparatus 110 may reduce influence by a reflected wave and prevent a failure of wireless communication by changing the angle at which communication is possible from an angle 30a to an angle 30b (in other words, weakening directivity in the ground direction).

Note that the above description is merely an example, and the processing content can be changed as appropriate. For example, change control of the communication range may be realized by the imaging apparatus 100 instead of being realized by the variable directivity antenna apparatus 110. More specifically, the imaging apparatus 100 may estimate a cause which degrades a communication environment on the basis of various kinds of information provided from the variable directivity antenna apparatus 110 (such as, for example, received strength information of the wireless signal and error occurrence information), an analysis result of the captured image data (such as, for example, an analysis result as to whether or not there is the ground or strong noise occurrence source), or the like, and may control the communication range so as to avoid a range which is the cause. Further, the communication range may be changed by elements other than the angle at which communication is possible 30 being controlled. Further, the sound collection range in the third embodiment may be controlled in a manner similar to the above. More specifically, in a case where a sound collection environment is poor, the sound collection range may be controlled so as to avoid a range which is a cause of the poor sound collection environment.

6. Application Examples

The technology according to the present disclosure can be applied to various products. For example, the technology according to the present disclosure is implemented as apparatuses mounted on any type of mobile bodies such as automobiles, electric vehicles, hybrid electric vehicles, motorcycles, bicycles, personal mobilities, airplanes, drones, ships, robots, construction machines, and agricultural machines (tractors).

Figure 22:
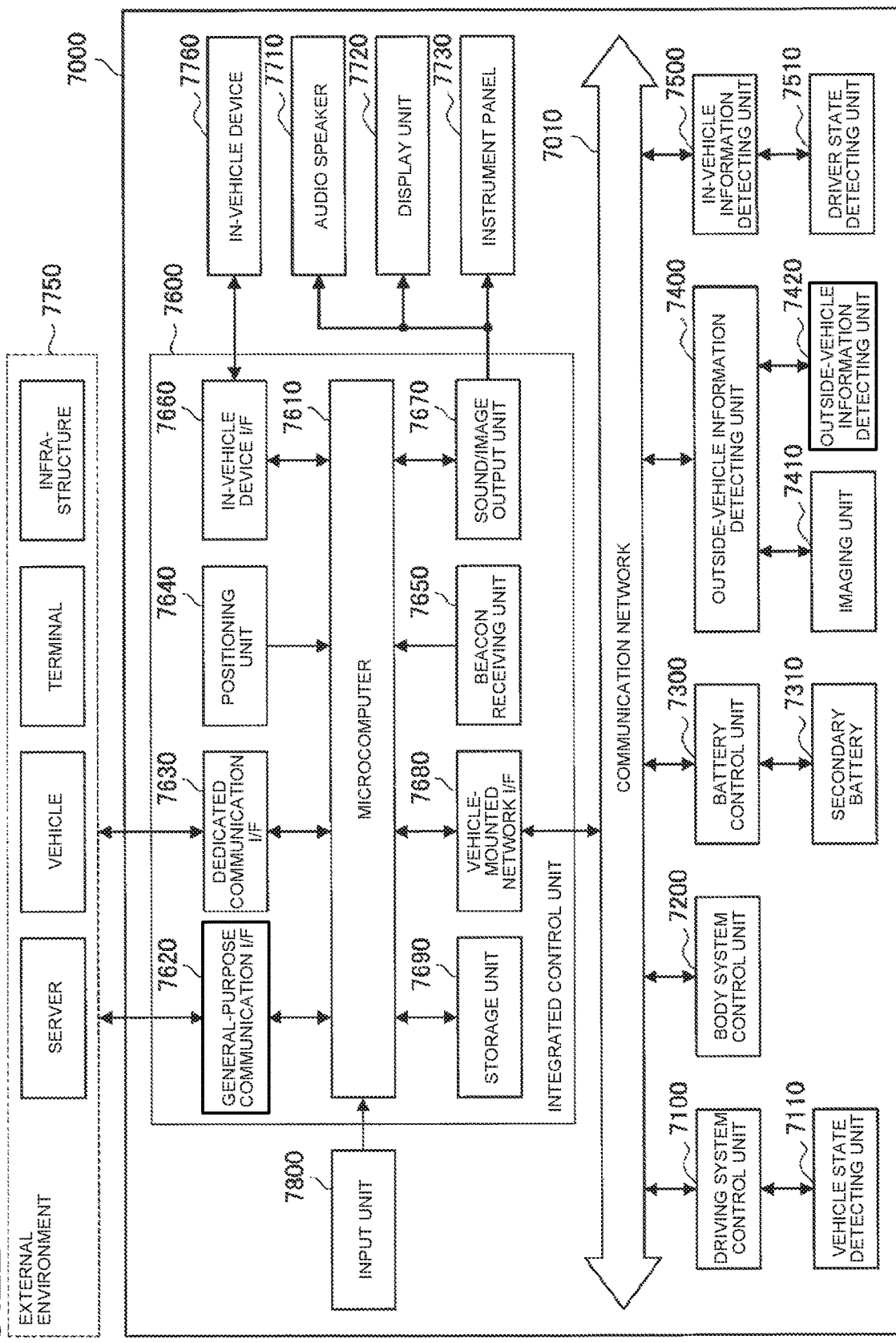
FIG. 22 is a block diagram illustrating schematic configuration example of a vehicle control system.

FIG. 22 is a block diagram depicting an example of schematic configuration of a vehicle control system 7000 as an example of a mobile body control system to which the technology according to an embodiment of the present disclosure can be applied. The vehicle control system 7000 includes a plurality of electronic control units connected to each other via a communication network 7010. In the example depicted in FIG. 22, the vehicle control system 7000 includes a driving system control unit 7100, a body system control unit 7200, a battery control unit 7300, an outside-vehicle information detecting unit 7400, an in-vehicle information detecting unit 7500, and an integrated control unit 7600. The communication network 7010 connecting the plurality of control units to each other may, for example, be a vehicle-mounted communication network compliant with an arbitrary standard such as controller area network (CAN), local interconnect network (LIN), local area network (LAN), FlexRay (registered trademark), or the like.

Each of the control units includes: a microcomputer that performs arithmetic processing according to various kinds of programs; a storage unit that stores the programs executed by the microcomputer, parameters used for various kinds of operations, or the like; and a driving circuit that drives various kinds of control target devices. Each of the control units further includes: a network interface (I/F) for performing communication with other control units via the communication network 7010; and a communication I/F for performing communication with a device, a sensor, or the like within and without the vehicle by wire communication or wireless communication. A functional configuration of the integrated control unit 7600 illustrated in FIG. 22 includes a microcomputer 7610, a general-purpose communication I/F 7620, a dedicated communication I/F 7630, a positioning unit 7640, a beacon receiving unit 7650, an in-vehicle device I/F 7660, a sound/image output unit 7670, a vehicle-mounted network I/F 7680, and a storage unit 7690. The other control units similarly include a microcomputer, a communication I/F, a storage unit, and the like.

The driving system control unit 7100 controls the operation of devices related to the driving system of the vehicle in accordance with various kinds of programs. For example, the driving system control unit 7100 functions as a control device for a driving force generating device for generating the driving force of the vehicle, such as an internal combustion engine, a driving motor, or the like, a driving force transmitting mechanism for transmitting the driving force to wheels, a steering mechanism for adjusting the steering angle of the vehicle, a braking device for generating the braking force of the vehicle, and the like. The driving system control unit 7100 may have a function as a control device of an antilock brake system (ABS), electronic stability control (ESC), or the like.

The driving system control unit 7100 is connected with a vehicle state detecting unit 7110. The vehicle state detecting unit 7110, for example, includes at least one of a gyro sensor that detects the angular velocity of axial rotational movement of a vehicle body, an acceleration sensor that detects the acceleration of the vehicle, and sensors for detecting an amount of operation of an accelerator pedal, an amount of operation of a brake pedal, the steering angle of a steering wheel, an engine speed or the rotational speed of wheels, and the like. The driving system control unit 7100 performs arithmetic processing using a signal input from the vehicle state detecting unit 7110, and controls the internal combustion engine, the driving motor, an electric power steering device, the brake device, and the like.

The body system control unit 7200 controls the operation of various kinds of devices provided to the vehicle body in accordance with various kinds of programs. For example, the body system control unit 7200 functions as a control device for a keyless entry system, a smart key system, a power window device, or various kinds of lamps such as a headlamp, a backup lamp, a brake lamp, a turn signal, a fog lamp, or the like. In this case, radio waves transmitted from a mobile device as an alternative to a key or signals of various kinds of switches can be input to the body system control unit 7200. The body system control unit 7200 receives these input radio waves or signals, and controls a door lock device, the power window device, the lamps, or the like of the vehicle.

The battery control unit 7300 controls a secondary battery 7310, which is a power supply source for the driving motor, in accordance with various kinds of programs. For example, the battery control unit 7300 is supplied with information about a battery temperature, a battery output voltage, an amount of charge remaining in the battery, or the like from a battery device including the secondary battery 7310. The battery control unit 7300 performs arithmetic processing using these signals, and performs control for regulating the temperature of the secondary battery 7310 or controls a cooling device provided to the battery device or the like.

The outside-vehicle information detecting unit 7400 detects information about the outside of the vehicle including the vehicle control system 7000. For example, the outside-vehicle information detecting unit 7400 is connected with at least one of an imaging unit 7410 and an outside-vehicle information detecting unit 7420. The imaging unit 7410 includes at least one of a time-of-flight (ToF) camera, a stereo camera, a monocular camera, an infrared camera, and other cameras. The outside-vehicle information detecting unit 7420, for example, includes at least one of an environmental sensor for detecting current atmospheric conditions or weather conditions and a peripheral information detecting sensor for detecting another vehicle, an obstacle, a pedestrian, or the like on the periphery of the vehicle including the vehicle control system 7000.

The environmental sensor, for example, may be at least one of a rain drop sensor detecting rain, a fog sensor detecting a fog, a sunshine sensor detecting a degree of sunshine, and a snow sensor detecting a snowfall. The peripheral information detecting sensor may be at least one of an ultrasonic sensor, a radar device, and a LIDAR device (Light detection and Ranging device, or Laser imaging detection and ranging device). Each of the imaging unit 7410 and the outside-vehicle information detecting unit 7420 may be provided as an independent sensor or device, or may be provided as a device in which a plurality of sensors or devices are integrated.

Figure 23:
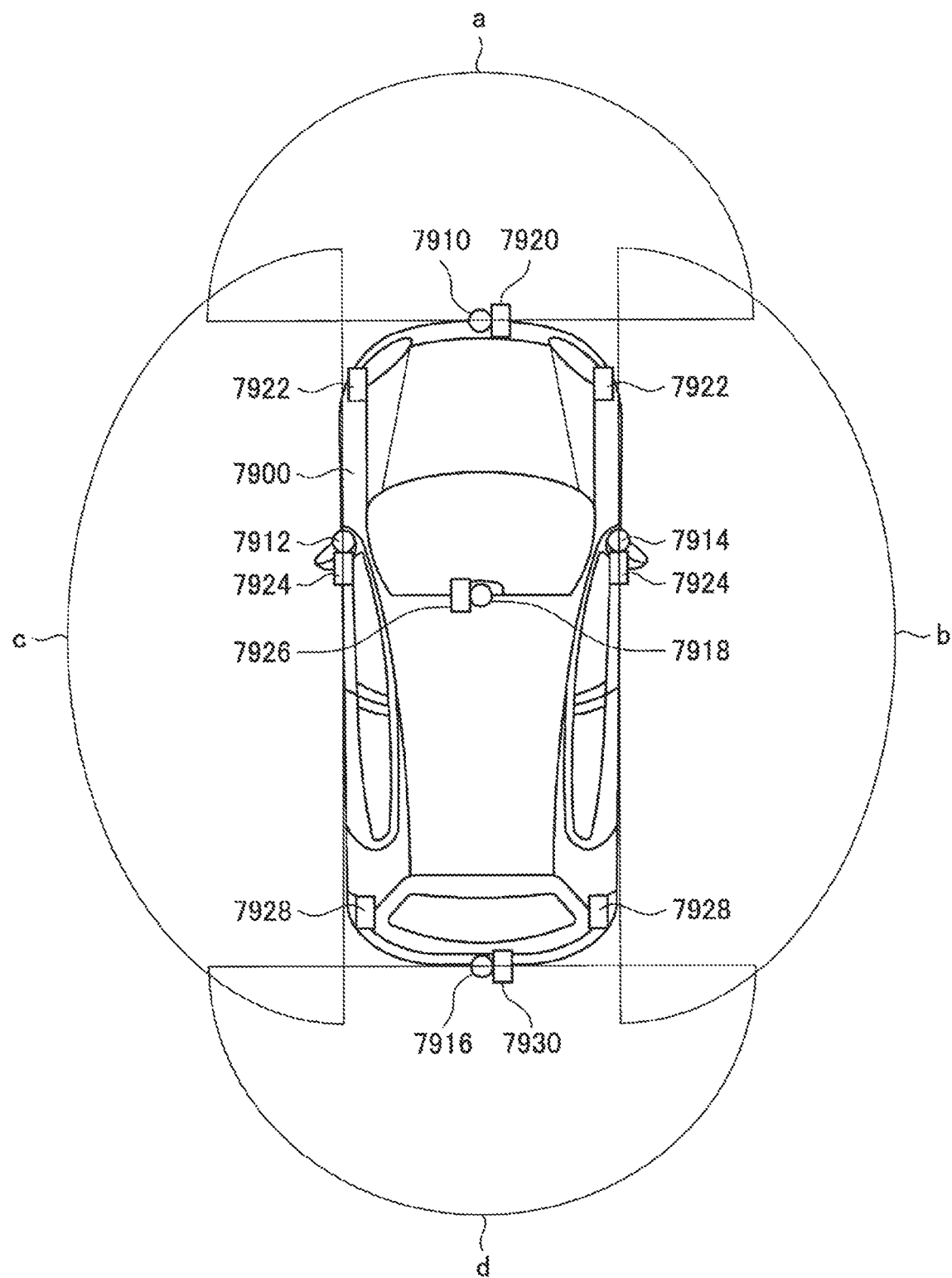
FIG. 23 is a diagram illustrating an example of an installation position of an outside-vehicle information detecting unit and an image-capturing unit.

Here, FIG. 23 depicts an example of installation positions of the imaging unit 7410 and the outside-vehicle information detecting unit 7420. Imaging units 7910, 7912, 7914, 7916, and 7918 are, for example, disposed at least one of positions on a front nose, sideview mirrors, a rear bumper, and a back door of the vehicle 7900 and a position on an upper portion of a windshield within the interior of the vehicle. The imaging unit 7910 provided to the front nose and the imaging unit 7918 provided to the upper portion of the windshield within the interior of the vehicle obtain mainly an image of the front of the vehicle 7900. The imaging units 7912 and 7914 provided to the sideview mirrors obtain mainly an image of the sides of the vehicle 7900. The imaging unit 7916 provided to the rear bumper or the back door obtains mainly an image of the rear of the vehicle 7900. The imaging unit 7918 provided to the upper portion of the windshield within the interior of the vehicle is used mainly to detect a preceding vehicle, a pedestrian, an obstacle, a signal, a traffic sign, a lane, or the like.

Incidentally, FIG. 23 depicts an example of photographing ranges of the respective imaging units 7910, 7912, 7914, and 7916. An imaging range a represents the imaging range of the imaging unit 7910 provided to the front nose. Imaging ranges b and c respectively represent the imaging ranges of the imaging units 7912 and 7914 provided to the sideview mirrors. An imaging range d represents the imaging range of the imaging unit 7916 provided to the rear bumper or the back door. A bird's-eye image of the vehicle 7900 as viewed from above can be obtained by superimposing image data imaged by the imaging units 7910, 7912, 7914, and 7916, for example.

Outside-vehicle information detecting units 7920, 7922, 7924, 7926, 7928, and 7930 provided to the front, rear, sides, and corners of the vehicle 7900 and the upper portion of the windshield within the interior of the vehicle may be, for example, an ultrasonic sensor or a radar device. The outside-vehicle information detecting units 7920, 7926, and 7930 provided to the front nose of the vehicle 7900, the rear bumper, the back door of the vehicle 7900, and the upper portion of the windshield within the interior of the vehicle may be a LIDAR device, for example. These outside-vehicle information detecting units 7920 to 7930 are used mainly to detect a preceding vehicle, a pedestrian, an obstacle, or the like.

Returning to FIG. 22, the description will be continued. The outside-vehicle information detecting unit 7400 makes the imaging unit 7410 image an image of the outside of the vehicle, and receives imaged image data. In addition, the outside-vehicle information detecting unit 7400 receives detection information from the outside-vehicle information detecting unit 7420 connected to the outside-vehicle information detecting unit 7400. In a case where the outside-vehicle information detecting unit 7420 is an ultrasonic sensor, a radar device, or a LIDAR device, the outside-vehicle information detecting unit 7400 transmits an ultrasonic wave, an electromagnetic wave, or the like, and receives information of a received reflected wave. On the basis of the received information, the outside-vehicle information detecting unit 7400 may perform processing of detecting an object such as a human, a vehicle, an obstacle, a sign, a character on a road surface, or the like, or processing of detecting a distance thereto. The outside-vehicle information detecting unit 7400 may perform environment recognition processing of recognizing a rainfall, a fog, road surface conditions, or the like on the basis of the received information. The outside-vehicle information detecting unit 7400 may calculate a distance to an object outside the vehicle on the basis of the received information.

In addition, on the basis of the received image data, the outside-vehicle information detecting unit 7400 may perform image recognition processing of recognizing a human, a vehicle, an obstacle, a sign, a character on a road surface, or the like, or processing of detecting a distance thereto. The outside-vehicle information detecting unit 7400 may subject the received image data to processing such as distortion correction, alignment, or the like, and combine the image data imaged by a plurality of different imaging units 7410 to generate a bird's-eye image or a panoramic image. The outside-vehicle information detecting unit 7400 may perform viewpoint conversion processing using the image data imaged by the imaging unit 7410 including the different imaging parts.

The in-vehicle information detecting unit 7500 detects information about the inside of the vehicle. The in-vehicle information detecting unit 7500 is, for example, connected with a driver state detecting unit 7510 that detects the state of a driver. The driver state detecting unit 7510 may include a camera that images the driver, a biosensor that detects biological information of the driver, a microphone that collects sound within the interior of the vehicle, or the like. The biosensor is, for example, disposed in a seat surface, the steering wheel, or the like, and detects biological information of an occupant sitting in a seat or the driver holding the steering wheel. On the basis of detection information input from the driver state detecting unit 7510, the in-vehicle information detecting unit 7500 may calculate a degree of fatigue of the driver or a degree of concentration of the driver, or may determine whether the driver is dozing. The in-vehicle information detecting unit 7500 may subject an audio signal obtained by the collection of the sound to processing such as noise canceling processing or the like.

The integrated control unit 7600 controls general operation within the vehicle control system 7000 in accordance with various kinds of programs. The integrated control unit 7600 is connected with an input unit 7800. The input unit 7800 is implemented by a device capable of input operation by an occupant, such, for example, as a touch panel, a button, a microphone, a switch, a lever, or the like. The integrated control unit 7600 may be supplied with data obtained by voice recognition of voice input through the microphone. The input unit 7800 may, for example, be a remote control device using infrared rays or other radio waves, or an external connecting device such as a mobile telephone, a personal digital assistant (PDA), or the like that supports operation of the vehicle control system 7000. The input unit 7800 may be, for example, a camera. In that case, an occupant can input information by gesture. Alternatively, data may be input which is obtained by detecting the movement of a wearable device that an occupant wears. Further, the input unit 7800 may, for example, include an input control circuit or the like that generates an input signal on the basis of information input by an occupant or the like using the above-described input unit 7800, and which outputs the generated input signal to the integrated control unit 7600. An occupant or the like inputs various kinds of data or gives an instruction for processing operation to the vehicle control system 7000 by operating the input unit 7800.

The storage unit 7690 may include a read only memory (ROM) that stores various kinds of programs executed by the microcomputer and a random access memory (RAM) that stores various kinds of parameters, operation results, sensor values, or the like. In addition, the storage unit 7690 may be implemented by a magnetic storage device such as a hard disc drive (HDD) or the like, a semiconductor storage device, an optical storage device, a magneto-optical storage device, or the like.

The general-purpose communication I/F 7620 is a communication I/F used widely, which communication I/F mediates communication with various apparatuses present in an external environment 7750. The general-purpose communication I/F 7620 may implement a cellular communication protocol such as global system of mobile communications (GSM, registered trademark), worldwide interoperability for microwave access (WiMAX, registered trademark), long term evolution (LTE, registered trademark)), LTE-advanced (LTE-A), or the like, or another wireless communication protocol such as wireless LAN (referred to also as wireless fidelity (Wi-Fi), Bluetooth, or the like. The general-purpose communication I/F 7620 may, for example, connect to an apparatus (for example, an application server or a control server) present on an external network (for example, the Internet, a cloud network, or a company-specific network) via a base station or an access point. In addition, the general-purpose communication I/F 7620 may connect to a terminal present in the vicinity of the vehicle (which terminal is, for example, a terminal of the driver, a pedestrian, or a store, or a machine type communication (MTC) terminal) using a peer to peer (P2P) technology, for example.

The dedicated communication I/F 7630 is a communication I/F that supports a communication protocol developed for use in vehicles. The dedicated communication I/F 7630 may implement a standard protocol such, for example, as wireless access in vehicle environment (WAVE), which is a combination of institute of electrical and electronic engineers (IEEE) 802.11p as a lower layer and IEEE 1609 as a higher layer, dedicated short range communications (DSRC), or a cellular communication protocol. The dedicated communication I/F 7630 typically carries out V2X communication as a concept including one or more of communication between a vehicle and a vehicle (Vehicle to Vehicle), communication between a road and a vehicle (Vehicle to Infrastructure), communication between a vehicle and a home (Vehicle to Home), and communication between a pedestrian and a vehicle (Vehicle to Pedestrian).

The positioning unit 7640, for example, performs positioning by receiving a global navigation satellite system (GNSS) signal from a GNSS satellite (for example, a GPS signal from a global positioning system (GPS) satellite), and generates positional information including the latitude, longitude, and altitude of the vehicle. Incidentally, the positioning unit 7640 may identify a current position by exchanging signals with a wireless access point, or may obtain the positional information from a terminal such as a mobile telephone, a personal handy phone system (PHS), or a smart phone that has a positioning function.

The beacon receiving unit 7650, for example, receives a radio wave or an electromagnetic wave transmitted from a wireless station installed on a road or the like, and thereby obtains information about the current position, congestion, a closed road, a necessary time, or the like. Incidentally, the function of the beacon receiving unit 7650 may be included in the dedicated communication I/F 7630 described above.

The in-vehicle device I/F 7660 is a communication interface that mediates connection between the microcomputer 7610 and various in-vehicle devices 7760 present within the vehicle. The in-vehicle device I/F 7660 may establish wireless connection using a wireless communication protocol such as wireless LAN, Bluetooth, near field communication (NFC), or wireless universal serial bus (WUSB). In addition, the in-vehicle device I/F 7660 may establish wired connection by universal serial bus (USB), high-definition multimedia interface (HDMI, registered trademark), mobile high-definition link (MHL), or the like via a connection terminal (and a cable if necessary) not depicted in the figures. The in-vehicle devices 7760 may, for example, include at least one of a mobile device and a wearable device possessed by an occupant and an information device carried into or attached to the vehicle. Further, the in-vehicle devices 7760 may also include a navigation device that searches for a path to an arbitrary destination. The in-vehicle device I/F 7660 exchanges control signals or data signals with these in-vehicle devices 7760.

The vehicle-mounted network I/F 7680 is an interface that mediates communication between the microcomputer 7610 and the communication network 7010. The vehicle-mounted network I/F 7680 transmits and receives signals or the like in conformity with a predetermined protocol supported by the communication network 7010.

The microcomputer 7610 of the integrated control unit 7600 controls the vehicle control system 7000 in accordance with various kinds of programs on the basis of information obtained via at least one of the general-purpose communication I/F 7620, the dedicated communication I/F 7630, the positioning unit 7640, the beacon receiving unit 7650, the in-vehicle device I/F 7660, and the vehicle-mounted network I/F 7680. For example, the microcomputer 7610 may calculate a control target value for the driving force generating device, the steering mechanism, or the braking device on the basis of the obtained information about the inside and outside of the vehicle, and output a control command to the driving system control unit 7100. For example, the microcomputer 7610 may perform cooperative control intended to implement functions of an advanced driver assistance system (ADAS) which functions include collision avoidance or shock mitigation for the vehicle, following driving based on a following distance, vehicle speed maintaining driving, a warning of collision of the vehicle, a warning of deviation of the vehicle from a lane, or the like. In addition, the microcomputer 7610 may perform cooperative control intended for automatic driving, which makes the vehicle to travel autonomously without depending on the operation of the driver, or the like, by controlling the driving force generating device, the steering mechanism, the braking device, or the like on the basis of the obtained information about the surroundings of the vehicle.

The microcomputer 7610 may generate three-dimensional distance information between the vehicle and an object such as a surrounding structure, a person, or the like, and generate local map information including information about the surroundings of the current position of the vehicle, on the basis of information obtained via at least one of the general-purpose communication I/F 7620, the dedicated communication I/F 7630, the positioning unit 7640, the beacon receiving unit 7650, the in-vehicle device I/F 7660, and the vehicle-mounted network I/F 7680. In addition, the microcomputer 7610 may predict danger such as collision of the vehicle, approaching of a pedestrian or the like, an entry to a closed road, or the like on the basis of the obtained information, and generate a warning signal. The warning signal may, for example, be a signal for producing a warning sound or lighting a warning lamp.

The sound/image output unit 7670 transmits an output signal of at least one of a sound and an image to an output device capable of visually or auditorily notifying information to an occupant of the vehicle or the outside of the vehicle. In the example of FIG. 22, an audio speaker 7710, a display unit 7720, and an instrument panel 7730 are illustrated as the output device. The display unit 7720 may, for example, include at least one of an on-board display and a head-up display. The display unit 7720 may have an augmented reality (AR) display function. The output device may be other than these devices, and may be another device such as headphones, a wearable device such as an eyeglass type display worn by an occupant or the like, a projector, a lamp, or the like. In a case where the output device is a display device, the display device visually displays results obtained by various kinds of processing performed by the microcomputer 7610 or information received from another control unit in various forms such as text, an image, a table, a graph, or the like. In addition, in a case where the output device is an audio output device, the audio output device converts an audio signal constituted of reproduced audio data or sound data or the like into an analog signal, and auditorily outputs the analog signal.

Incidentally, at least two control units connected to each other via the communication network 7010 in the example depicted in FIG. 22 may be integrated into one control unit. Alternatively, each individual control unit may include a plurality of control units. Further, the vehicle control system 7000 may include another control unit not depicted in the figures. In addition, part or the whole of the functions performed by one of the control units in the above description may be assigned to another control unit. That is, predetermined arithmetic processing may be performed by any of the control units as long as information is transmitted and received via the communication network 7010. Similarly, a sensor or a device connected to one of the control units may be connected to another control unit, and a plurality of control units may mutually transmit and receive detection information via the communication network 7010.

Note that it is possible to implement a computer program for realizing respective functions of the imaging apparatus 100 according to the present embodiment described using FIG. 4 at one of control units, or the like. Further, it is also possible to provide a computer-readable recording medium having such a computer program stored therein. The recording medium is, for example, a magnetic disk, an optical disk, a magneto-optical disk, a flash memory, or the like. Further, the above-described computer program may be distributed, for example, via a network without using a recording medium.

In the vehicle control system 7000 described above, the imaging apparatus 100, the variable directivity antenna apparatus 110 or the imaging control apparatus 200 according to the present embodiment described using FIG. 4 can be applied to the vehicle control system 7000 in the application example illustrated in FIG. 22.

More specifically, first, in the application example, it is assumed that the tag apparatus 300 is worn by a pedestrian (who is only required to be a person, and not limited to a person who is walking) or attached to another vehicle. In a case where the tag apparatus 300 is worn (or carried) by a pedestrian, the tag apparatus 300 can be, for example, a smartphone, or the like. Note that, in this case, the tag apparatus 300 is not limited to a smartphone, and may be, for example, an arbitrary information processing apparatus including a wearable apparatus. Further, in a case where the tag apparatus 300 is attached to (or mounted on) another vehicle, the tag apparatus 300 can be, for example, arbitrary in-vehicle equipment. Note that the tag apparatus 300 may be attached to an object other than a pedestrian or another vehicle. For example, the tag apparatus 300 may be attached to an arbitrary living thing such as a pet, a mobile body other than a car, arbitrary facility such as a traffic light and a road sign, or the like.

Further, the integrated control unit 7600 controls the imaging range and the communication range in coordination with each other. More specifically, the microcomputer 7610 of the integrated control unit 7600 can function as the control unit 102, and the imaging unit 7410 can function as the imaging unit 104, the lens 120 or the magnifying optical apparatus 130. The general-purpose communication I/F 7620 can function as the variable directivity antenna apparatus 110 (in other words, the general-purpose communication I/F 7620 has variable directivity). Then, the microcomputer 7610 can control the imaging range of the imaging unit 7410 and the communication range of the general-purpose communication I/F 7620 in coordination with each other using predetermined control information. Note that, while relationship between the imaging range and the communication range can be similar to that described above (for example, FIG. 2 and FIG. 3), the relationship is not limited to this.

Note that a trigger for the microcomputer 7610 to control the imaging range and the communication range in coordination with each other is not particularly limited. For example, in a case where an own vehicle approaches a crosswalk, an intersection, or the like, (for example, in a case where an isolation distance between the own vehicle and a crosswalk, or the like, becomes equal to or less than a predetermined distance), the microcomputer 7610 may expand the imaging range and the communication range in coordination with each other. By this means, the general-purpose communication I/F 7620 can more easily detect the tag apparatus 300 (tag ID) of the pedestrian or another vehicle. Note that a method for detecting approach of the own vehicle to a crosswalk, an intersection, or the like, is not particularly limited. For example, the microcomputer 7610 may detect approach of the own vehicle to a crosswalk, an intersection, or the like, on the basis of position information from the positioning unit 7640, an analysis result of the captured image from the imaging unit 7410, a wireless communication result with an arbitrary apparatus provided near the crosswalk or the intersection, or the like. Further, as well as the above, the microcomputer 7610 may expand the imaging range and the communication range in coordination with each other in a case where a dangerous situation (such as, for example, a traffic accident) is detected or predicted using a predetermined method.

Then, the integrated control unit 7600 performs predetermined control on the basis of the detected tag ID and the pre-setting. For example, the integrated control unit 7600 can control travelling of the own vehicle on the basis of the detected tag ID and the pre-setting. More specifically, in a case where the tag ID is detected, the microcomputer 7610 can automatically (or autonomously) realize arbitrary operation including acceleration, deceleration (braking), turning right, turning left, lane change, stop, collision prevention, collision relaxation (such as, for example, opening of an air bag), or the like, (in other words, can realize automated driving) by controlling processing regarding overall traveling of the own vehicle on the basis of the pre-setting. By this means, for example, the microcomputer 7610 can realize avoidance of collision of a pedestrian and the own vehicle, or the like. Note that content of traveling control to be realized by the present disclosure is not limited to the above-described content.

Further, the integrated control unit 7600 can also realize imaging control on the basis of the detected tag ID and the pre-setting. More specifically, in a case where a tag ID is detected, the microcomputer 7610 may capture an image of a region of interest (for example, a region near the detection position of the tag ID) with high resolution, may magnify and capture an image, or may improve accuracy of an arbitrary sensor regarding imaging by controlling the imaging unit 7410 on the basis of the pre-setting. By this means, for example, the microcomputer 7610 can cause details of collision of the pedestrian and the own vehicle to be recorded upon occurrence of a traffic accident. Of course, as described above, the microcomputer 7610 may manage the captured image data and information regarding the tag ID in association with each other. Note that the content of imaging control to be realized by the present disclosure is not limited to the above-described content. Further, also in the application example, it is assumed that the user can make setting regarding traveling control, imaging control, or the like, in advance using the imaging control apparatus 200.

Further, also in the application example, the technologies from the above-described second to fourth embodiments may be applied. More specifically, the integrated control unit 7600 may realize switching of the captured image data from a plurality of imaging units 7410 (only one imaging unit 7410 is illustrated in FIG. 22) on the basis of detection of the tag ID, may realize various kinds of control on the basis of speech emitted from the subject by also causing the sound collection range of the variable directivity microphone (not illustrated in FIG. 22) to coordinate with the imaging range, or the like, or may realize tracking of the subject on the basis of the tag ID.

Further, as least part of components of the imaging apparatus 100 described using FIG. 4 may be realized at a module (for example, an integrated circuit module constituted with one die) for the integrated control unit 7600 illustrated in FIG. 22. Alternatively, the imaging apparatus 100 described using FIG. 4 may be realized by a plurality of control units of the vehicle control system 7000 illustrated in FIG. 22.

7. Conclusion

As described above, the imaging apparatus 100 according to the first embodiment of the present disclosure has a communication range corresponding to the imaging range of the own apparatus, performs wireless communication with the tag apparatus 300 located in the imaging range by causing the imaging range to coordinate with the communication range, and acquires a tag ID. Then, the imaging apparatus 100 performs imaging control on the basis of the tag ID and pre-setting by the user. By this means, the user can cause the imaging apparatus 100 to perform desired imaging control.

Further, according to the second embodiment of the present disclosure, it is possible to switch the captured image data generated by a plurality of imaging apparatuses 100 on the basis of the detected tag ID and the reception status of the detected wireless signal. Further, according to the third embodiment of the present disclosure, it is possible to switch the captured image data generated by a plurality of imaging apparatuses 100 on the basis of speech emitted from the subject as well as the detected tag ID and the reception status of the wireless signal. Further, according to the fourth embodiment of the present disclosure, it is possible to track the subject 10 on the basis of the detected tag ID. By the respective embodiments described above, it is possible to reduce burden of the user in association with imaging.

Further, as the application example, the technology according to the present disclosure may be applied to a mobile body such as a car. More specifically, by the own vehicle to which the technology according to the present disclosure is applied controlling the imaging range and the communication range in coordination with each other, it is possible to appropriately detect the tag apparatus 300 worn by a pedestrian or attached to another vehicle, or the like, and realize traveling control, imaging control, or the like, of the own vehicle on the basis of the detection result.

The preferred embodiment(s) of the present disclosure has/have been described above with reference to the accompanying drawings, whilst the present technology is not limited to the above examples. A person skilled in the art may find various alterations and modifications within the scope of the appended claims, and it should be understood that they will naturally come under the technical scope of the present disclosure.

Further, the effects described in this specification are merely illustrative or exemplified effects, and are not limitative. That is, with or in the place of the above effects, the technology according to the present disclosure may achieve other effects that are clear to those skilled in the art from the description of this specification.

Note that the following configuration also falls within the technical scope of the present disclosure.

(1)

An imaging apparatus comprising:

an imaging unit configured to perform imaging;

a communication unit having a communication range corresponding to an imaging range in which the imaging is performed, and configured to perform communication with an external apparatus located within the communication range; and an imaging control unit configured to control processing regarding the imaging on a basis of information regarding the external apparatus acquired through the communication and pre-setting associated with the information regarding the external apparatus.

(2)

The imaging apparatus according to (1), wherein the pre-setting is made on a basis of user input to an imaging control apparatus which is capable of performing communication with the imaging apparatus.

(3)

The imaging apparatus according to (1) or (3), further comprising:

a control unit configured to control the imaging range and the communication range in coordination with each other.

(4)

The imaging apparatus according to (3), wherein the control unit expands the communication range in coordination with expansion of the imaging range, and narrows the communication range in coordination with narrowing of the imaging range.

(5)

The imaging apparatus according to (3) or (4), wherein the control unit controls the communication range by controlling a variable directivity antenna apparatus.

(6)

The imaging apparatus according to any one of (1) to (5), wherein the imaging range is expressed with an angle of view, the communication range is expressed with an angle at which communication is possible when the communication unit is set as a reference, and the angle of view is smaller than the angle at which communication is possible.

(7)

The imaging apparatus according to any one of (1) to (6), wherein the external apparatus is worn by a subject for whom an image is to be captured, or is carried by the subject.

(8)

The imaging apparatus according to (7), further comprising:

a sound collecting unit having a sound collection range corresponding to the imaging range or the communication range and configured to collect speech emitted from the subject located in the sound collection range, wherein the imaging control unit controls processing regarding the imaging also on a basis of the speech.

(9)

The imaging apparatus according to (8), further comprising:

a control unit configured to cause the sound collection range to coordinate with the imaging range or the communication range.

(10)

The imaging apparatus according to (9), wherein the control unit controls the sound collection range by controlling a variable directivity microphone.

(11)

The imaging apparatus according to (7), further comprising:

a position estimating unit configured to estimate a position of the external apparatus on a basis of an arrival direction and received strength of a wireless signal in the communication, wherein the imaging control unit performs processing regarding the imaging in a case where the position of the external apparatus is included in the imaging range.

(12)

The imaging apparatus according to (11), wherein the imaging control unit controls start of imaging, end of imaging, predetermined video correction processing, an angle of view or zoom magnification on a basis of the information regarding the external apparatus and the pre-setting.

(13)

The imaging apparatus according to (11) or (12), wherein a plurality of the imaging units exists, and the imaging control unit controls switching of the imaging unit which captures image data to be used for provision of service.

(14)

The imaging apparatus according to (13), wherein the imaging control unit controls the switching also on a basis of height of received strength of a wireless signal.

(15)

The imaging apparatus according to any one of (11) to (14), wherein the imaging control unit controls the imaging range on a basis of the position of the external apparatus.

(16)

The imaging apparatus according to (15), wherein the imaging control unit causes the imaging range to track the position of the external apparatus.

(17)

The imaging apparatus according to any one of (1) to (16), further comprising;

a recording unit configured to record captured image data generated by the imaging and the information regarding the external apparatus in association with each other.

(18)

The imaging apparatus according to any one of (1) to (17), wherein the information regarding the external apparatus includes identification information of the external apparatus or scene information concerning the imaging.

(19)

The imaging apparatus according to (18), further comprising:

a scene estimating unit configured to estimate a scene for the imaging on a basis of the information regarding the external apparatus acquired through the communication in a case where the information regarding the external apparatus is identification information of the external apparatus, wherein the imaging control unit controls processing regarding the imaging on a basis of the scene estimated by the scene estimating unit.

(20) An imaging method to be executed by a computer, the imaging method comprising:
performing imaging;
performing communication with an external apparatus located within a communication range which is provided to correspond to an imaging range in which the imaging is performed; and
controlling processing regarding the imaging on a basis of information regarding the external apparatus acquired through the communication and pre-setting associated with the information regarding the external apparatus.

(21) A program for causing a computer to realize: performing imaging;
performing communication with an external apparatus located within a communication range which is provided to correspond to an imaging range in which the imaging is performed; and
controlling processing regarding the imaging on a basis of information regarding the external apparatus acquired through the communication and pre-setting associated with the information regarding the external apparatus.

(22) An imaging apparatus comprising:
an imaging unit configured to perform imaging;
a communication unit having a communication range corresponding to an imaging range in which the imaging is performed and configured to perform communication with an external apparatus located within the communication range; and
a control unit configured to control the imaging range and the communication range in coordination with each other.

REFERENCE SIGNS LIST

100 Imaging apparatus
101 Information input unit
102 Control unit
103 Communication unit
104 Imaging unit
105 Storage unit
110 Variable directivity antenna apparatus
111 Antenna control unit
112 Reception information processing unit
120 Lens
121 Information output unit
130 Magnifying optical apparatus
131 Information output unit
200 Imaging control apparatus
201 Control unit
202 Input unit
203 Output unit
204 Communication unit
205 Storage unit
300 Tag apparatus
301 Control unit
302 Input unit
303 Output unit
304 Communication unit
305 Storage unit
400 Switcher
500 Relay apparatus
600 Variable directivity microphone
700 Tracking apparatus

The invention claimed is:

1. An imaging apparatus, comprising:
an imaging device configured to capture an image within an imaging range of the imaging device;
a communication device having a communication range corresponding to the imaging range, wherein the communication device is configured to:
receive a pre-setting from an imaging control apparatus based on a user input to the imaging control apparatus, wherein the pre-setting is associated with information related to an external apparatus;
execute communication with the external apparatus located within the communication range; and
acquire the information associated with the external apparatus based on the communication with the external apparatus; and
at least one processor configured to control the capture of the image based on the information associated with the external apparatus and the pre-setting associated with the information.

2. The imaging apparatus according to claim 1, wherein the imaging control apparatus communicates with the imaging apparatus.

3. The imaging apparatus according to claim 1, wherein the at least one processor is further configured to:
control the imaging range in coordination with the communication range; and
control the communication range in coordination with the imaging range.

4. The imaging apparatus according to claim 3, wherein the at least one processor is further configured to: expand the communication range in coordination with expansion of the imaging range; and narrow the communication range in coordination with a narrowing of the imaging range.

5. The imaging apparatus according to claim 3, wherein the at least one processor is further configured to control the communication range based on control of a variable directivity antenna apparatus.

6. The imaging apparatus according to claim 1, wherein the imaging range is expressed with an angle of view of the imaging device,
the communication range is expressed with an angle of the communication of the communication device, and
the angle of view is smaller than the angle of the communication.

7. The imaging apparatus according to claim 1, wherein the external apparatus is one of worn by a subject or carried by the subject, and
the imaging device is further configured to capture the image of the subject.

8. The imaging apparatus according to claim 7, further comprising
a sound collecting device having a sound collection range corresponding to one of the imaging range or the communication range wherein
the sound collection device is configured to collect speech emitted from the subject,
the subject is located in the sound collection range, and
the at least one processor is further configured to control the capture of the image based on the speech.

9. The imaging apparatus according to claim 8, wherein the at least one processor is further configured to control the sound collection range to coordinate with one of the imaging range or the communication range.

10. The imaging apparatus according to claim 9, wherein the at least one processor is further configured to control the sound collection range based on control of a variable directivity microphone.

11. The imaging apparatus according to claim 7, further comprising a position estimating device configured to estimate a position of the external apparatus based on:
an arrival direction of a wireless signal from the communication device; and
received strength of the wireless signal, wherein
the at least one processor is further configured to control the capture of the image based on inclusion of the position of the external apparatus in the imaging range.

12. The imaging apparatus according to claim 11, wherein the at least one processor is further configured to control at least one of a start of the capture of the image, an end of the capture of the image, a video correction process, an angle of view of the imaging device, or a zoom magnification associated with the imaging device based on the information and the pre-setting.

13. The imaging apparatus according to claim 11, further comprising a plurality of imaging devices, wherein
the at least one processor is further configured to control switching of the imaging device among the plurality of imaging devices, and the switched imaging device is further configured to capture image data to be used for provision of service.

14. The imaging apparatus according to claim 13, wherein the at least one processor is further configured to control the switching of the imaging device based on a strength of the wireless signal from the communication device.

15. The imaging apparatus according to claim 11, wherein the at least one processor is further configured to control the imaging range based on the position of the external apparatus.

16. The imaging apparatus according to claim 15, wherein the at least one processor is further configured to control the imaging range to track the position of the external apparatus.

17. The imaging apparatus according to claim 1, further comprising a recording device configured to record image data of the captured image in association with the information associated with the external apparatus.

18. The imaging apparatus according to claim 1, wherein the information associated with the external apparatus includes at least one of identification information of the external apparatus or scene information of the captured image.

19. The imaging apparatus according to claim 18, wherein the at least one processor is further configured to:
estimate a scene for the capture of the image, wherein
the estimation is based on the information associated with the external apparatus, and
the information associated with the external apparatus is identification information of the external apparatus, and
control the capture of the image based on the estimated scene.

20. An imaging method, comprising:
in an imaging device:
receiving a pre-setting from an imaging control apparatus based on a user input to the imaging control apparatus, wherein the pre-setting is associated with information related to an external apparatus;
executing communication with the external apparatus located within a communication range, wherein the communication range corresponds to an imaging range of the imaging device;
acquiring the information associated with the external apparatus based on the communication with the external apparatus; and
controlling capture of an image based on the information associated with the external apparatus and the pre-setting associated with the information.

21. A non-transitory computer-readable medium having stored thereon, computer-executable instructions, which when executed by a computer, cause the computer to execute operations, the operations comprising:
in an imaging device:
receiving a pre-setting from an imaging control apparatus based on a user input to the imaging control apparatus, wherein the pre-setting is associated with information related to an external apparatus;
executing communication with the external apparatus located within a communication range, wherein the communication range corresponds to an imaging range of the imaging device;
acquiring the information associated with the external apparatus based on the communication with the external apparatus; and
controlling capture of an image based on the information associated with the external apparatus and the pre-setting associated with the information.

22. An imaging apparatus, comprising:
an imaging device configured to capture an image within an imaging range of the imaging device;
a communication device having a communication range corresponding to the imaging range, wherein the communication device is configured to:
receive a pre-setting from an imaging control apparatus based on a user input to the imaging control apparatus, wherein the pre-setting is associated with information related to an external apparatus;
execute communication with the external apparatus located within the communication range; and
acquire the information associated with the external apparatus based on the communication with the external apparatus; and
at least one processor configured to:
control the imaging range in coordination with the communication range; and
control the capture of the image based on the information associated with the external apparatus and the pre-setting associated with the information.

* * * * *